US012658201B1

(12) United States Patent

Sayed et al.

(10) Patent No.: US 12,658,201 B1

(45) Date of Patent: Jun. 16, 2026

(54) TAPERED MAGNETIC MAIN POLE STRUCTURE WITH VARIABLE PEG GAP FOR HEAT-ASSISTED MAGNETIC RECORDING TECHNOLOGY

(71) Applicant: Headway Technologies, Inc., Milpitas, CA (US)

(72) Inventors: Shehrin Sayed, Fremont, CA (US); Weihao Xu, San Jose, CA (US); Moris Musa Dovek, San Jose, CA (US); Yuhui Tang, Milpitas, CA (US); Hong Guo, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/979,418

(22) Filed: Dec. 12, 2024

(51) Int. Cl.
  *G11B 5/31* (2006.01)
  *G11B 13/08* (2006.01)
  *G11B 5/00* (2006.01)

(52) U.S. Cl.
  CPC ............ *G11B 5/3116* (2013.01); *G11B 5/314* (2013.01); *G11B 13/08* (2013.01); *G11B 2005/0021* (2013.01)

(58) Field of Classification Search
  None
  See application file for complete search history.

(56) References Cited

U.S. PATENT DOCUMENTS

| | | | | |
|---|---|---|---|---|
| 8,848,495 | B1 * | 9/2014 | Wu ...................... | G11B 5/6088 |
| | | | | 369/13.33 |
| 8,947,986 | B1 * | 2/2015 | Araki ..................... | G11B 5/314 |
| | | | | 369/13.13 |
| 10,269,379 | B1 * | 4/2019 | Goggin .................. | G11B 5/012 |
| 10,748,572 | B1 | 8/2020 | Yang et al. | |
| 10,770,098 | B1 * | 9/2020 | Peng .................... | G11B 5/4866 |
| 10,839,830 | B1 | 11/2020 | Peng et al. | |
| 10,916,263 | B1 | 2/2021 | Truong et al. | |
| 11,315,597 | B1 * | 4/2022 | Shimazawa ............ | G11B 5/012 |
| 11,443,764 | B1 * | 9/2022 | Gan ...................... | G11B 5/4866 |
| 11,574,647 | B1 | 2/2023 | Yu et al. | |
| 11,651,791 | B2 | 5/2023 | Matsumoto et al. | |
| 11,657,844 | B1 | 5/2023 | Lee et al. | |
| 2009/0208171 | A1 * | 8/2009 | Gage ..................... | G11B 5/314 |
| | | | | 385/37 |
| 2014/0050058 | A1 * | 2/2014 | Zou ...................... | G11B 5/3133 |
| | | | | 369/13.33 |

(Continued)

OTHER PUBLICATIONS

Reinsel, D. et al., "Data Age 2025, The Digitization of the World—From Edge to Core", IDC White Paper, #U.S. Appl. No. 44/413,318, Nov. 2018.

(Continued)

*Primary Examiner* — Peter Vincent Agustin

(74) *Attorney, Agent, or Firm* — DLA Piper LLP (US)

(57) ABSTRACT

Writer head products for heat-assisted magnetic recording devices and methods of making the same are disclosed. The writer heads include multiple layers including a waveguide blocking layer, a waveguide layer, a near-field transducer layer, a heat sink layer, and a peg layer. The peg layer may comprise a small triangular section that extends from an air-bearing surface into the optical component. The writer heads further include a main magnetic pole adjacent to the optical component.

29 Claims, 22 Drawing Sheets

(56)                    References Cited

U.S. PATENT DOCUMENTS

| | | | |
|---|---|---|---|
| 2015/0279399 A1* | 10/2015 | Chen | G11B 5/4866 |
| | | | 29/601 |
| 2016/0118069 A1* | 4/2016 | Yang | G11B 5/314 |
| | | | 369/13.33 |
| 2016/0351209 A1* | 12/2016 | Chen | G11B 5/3116 |
| 2022/0220795 A1 | 7/2022 | Chen et al. | |

OTHER PUBLICATIONS

Notice of Allowance in U.S. Appl. No. 18/979,363, dated Jul. 3, 2025.

* cited by examiner 102    104    107

103

Waveguide

NFT Layer - 1
NFT Layer - 2

Heat Sink

Waveguide

NFT Layer - 1
NFT Layer - 2

Heat Sink

Waveguide

Heat Sink

NFT Layer - 1

NFT Layer - 2

MP

MP Layer - 2

TAPERED MAGNETIC MAIN POLE STRUCTURE WITH VARIABLE PEG GAP FOR HEAT-ASSISTED MAGNETIC RECORDING TECHNOLOGY

FIELD

The disclosure relates to a high-performance heat-assisted magnetic recording (HAMR) writer head and methods for making the HAMR writer head, for example as used in a writing a hard disk drive (HDD).

BACKGROUND

A magnetic writer head is an important component of HDD, which transforms an electric current in a coil into a strong magnetic field, that is applied on a media platter for efficient and high-density information writing. An increased areal density capacity (ADC) is needed for HDD as HDD technology progresses. One method of increasing the ADC, or the amount of data per square inch, is by decreasing the grain size of the media platter.

The growth in ADC largely depends on the shrinking media bits and shrinking write head structures to match the smaller grains. A larger coercive field for the media grains is required to maintain the stability of the electronic bits on the media when grain sizes are shrinking. However, limitations arise due to the degraded magnetic performance in shrinking writer heads operating at GHz frequencies.

The write heads used in perpendicular magnetic recording (PMR) use a main pole (MP) to apply a perpendicular field to the media bits; however, the writability substantially degrades as the dimensions are scaled down, especially when the grains on the media become smaller with larger coercivities. Heat-assisted magnetic recording (HAMR) and microwave-assisted magnetic recording (MAMR) technologies use an energy source (from heat and microwave, respectively) to make the media temporarily softer so that the magnetic field from a scaled-down write head is sufficient for efficient write operations.

Heat-assisted magnetic recording (HAMR) technology provides the pathways to substantially increase the amount of data that can be stored on a hard drive disk. A HAMR write head consists of a small laser diode that can temporarily transfer heat to tiny grains on the media platter to reduce the switching field and a magnetic writer element that applies magnetic flux to the heated media grains and writes information. Sharp thermal gradients, which translate into high magnetic gradients on the media, enable a higher data storage density than achievable with the legacy perpendicular magnetic recording technology. There exists a need for improvement in writer head technology.

SUMMARY

In some aspects, the techniques described herein relate to a writer head for a heat-assisted magnetic recording (HAMR) device, the writer head including: an optical component including: a triangular layer having a tapered edge; a first cladding layer positioned adjacent to the triangular layer; a waveguide (WG) layer positioned adjacent to the first cladding layer; a second cladding layer positioned adjacent to the WG layer; a near field transducer (NFT) layer positioned adjacent to the cladding layer; a heat sink layer positioned adjacent to the NFT layer; and a triangular peg gap layer positioned adjacent to the heat sink layer and including a tapered angle of about 20 degrees to about 70 degrees.; and a magnetic main pole positioned adjacent to the triangular peg gap layer and the heat sink layer and having a saturation magnetization of about 24 kG or greater.

In some aspects, the techniques described herein relate to a writer head, wherein a surface of the magnetic main pole includes a tapered angle equal to the tapered angle of the triangular peg gap layer.

In some aspects, the techniques described herein relate to a writer head, wherein a surface of the magnetic main pole opposite the tapered peg gap layer includes a flat surface.

In some aspects, the techniques described herein relate to a writer head, wherein a surface of the magnetic main pole opposite the tapered peg gap layer includes a taper including an angle equal and opposite to the angle of the triangular peg gap layer.

In some aspects, the techniques described herein relate to a writer head, wherein a surface of the magnetic main pole opposite the tapered peg gap layer includes a slope with an angle of about –15 degrees to about –45 degrees.

In some aspects, the techniques described herein relate to a writer head, wherein a surface of the magnetic main pole opposite the tapered peg gap layer includes a slope with an angle of about –15 degrees to about –45 degrees and wherein the surface of the heat sink layer contacting the magnetic main pole includes a taper with an angle of about –15 degrees to about –45 degrees.

In some aspects, the techniques described herein relate to a writer head, wherein the magnetic main pole includes a first layer adjacent to the peg gap layer and a second layer adjacent to the first layer wherein the first layer includes a lower magnetic moment than the second layer.

In some aspects, the techniques described herein relate to a writer head, wherein the first layer has a thickness of about 10 nm to about 50 nm.

In some aspects, the techniques described herein relate to a writer head, wherein the first layer includes one or more of CoFe, NiFe, CoFeNi and a dopant including a transition metal.

In some aspects, the techniques described herein relate to a writer head, wherein the dopant includes one or more of palladium or rhenium.

In some aspects, the techniques described herein relate to a writer head, wherein the triangular layer includes a waveguide blocking layer including ruthenium.

In some aspects, the techniques described herein relate to a writer head, wherein the triangular layer includes one or more of alumina or silica.

In some aspects, the techniques described herein relate to a writer head, wherein the NFT layer includes a first NFT layer including a first metal and a second NFT layer including a transition metal, wherein the first NFT layer includes one or more of gold, silver, copper, alloys thereof, graphene, and a metal oxide; and wherein the second NFT layer includes one of Rh or Ir.

In some aspects, the techniques described herein relate to a writer head, wherein the heat sink layer includes one or more of gold, ruthenium, aluminum nitride, or silicon carbide.

In some aspects, the techniques described herein relate to a writer head, wherein the optical component further includes a laser diode configured to generate a beam of light.

In some aspects, the techniques described herein relate to a writer head, wherein the magnetic component includes a first return pole operably connected to the main magnetic pole by a first connector and positioned on a side of the main magnetic pole opposite of the optical component.

In some aspects, the techniques described herein relate to a writer head, wherein the magnetic component further includes a coil including between 0 and 6 loops, wherein the coil is positioned between the first return pole and the main magnetic pole.

In some aspects, the techniques described herein relate to a writer head, wherein the distance between the first return pole and the main magnetic pole is about 50 nm to about 1,000 nm.

In some aspects, the techniques described herein relate to a writer head, wherein the first return pole has a thickness of about 500 nm to about 1,500 nm.

In some aspects, the techniques described herein relate to a writer head, wherein the first return pole includes a first pedestal with a thickness of about 1.5 μm to about 2.5 μm and a height of about 200 nm to about 1,000 nm.

In some aspects, the techniques described herein relate to a writer head, wherein the first return pole further includes a first magnetic leading shield (MLS) having a thickness of about 100 nm to about 1,000 nm and a height of about 500 nm to about 2,000 nm.

In some aspects, the techniques described herein relate to a writer head, wherein the magnetic component includes a first yoke positioned between the first connector and the main magnetic pole.

In some aspects, the techniques described herein relate to a writer head, wherein the main magnetic pole includes a sloped back edge having an angle of about 15 degrees to about −75 degrees.

In some aspects, the techniques described herein relate to a writer head, wherein the magnetic component includes a second return pole operably connected to the main magnetic pole by a second connector and positioned on a side of the main magnetic pole opposite of the first return pole.

In some aspects, the techniques described herein relate to a writer head, wherein the distance between the second return pole and the main magnetic pole is about 100 nm to about 1,000 nm.

In some aspects, the techniques described herein relate to a writer head, wherein the second return pole has a thickness of about 100 nm to about 1,500 nm.

In some aspects, the techniques described herein relate to a writer head, wherein the second return pole includes a second pedestal with a thickness of about 1.5 μm to about 2.5 μm and a height of about 200 nm to about 1,000 nm.

In some aspects, the techniques described herein relate to a writer head, wherein the second return pole further includes a second magnetic leading shield (MLS) having a thickness of about 100 nm to about 800 nm and a height of about 500 nm to about 1,000 nm.

In some aspects, the techniques described herein relate to a writer head, wherein the magnetic component further includes a first coil and a second coil, wherein the first coil and the second coil combined include between 0 and 6 loops, wherein the first coil is positioned between the first return pole and the main magnetic pole, wherein the second coil is positioned between the second return pole and the main magnetic pole, and wherein the first coil and the second coil include the same number of loops.

BRIEF DESCRIPTION OF DRAWINGS

FIGS. 1A-1E depict illustrative optical components for a writer head in accordance with an embodiment.

Figure 2C:
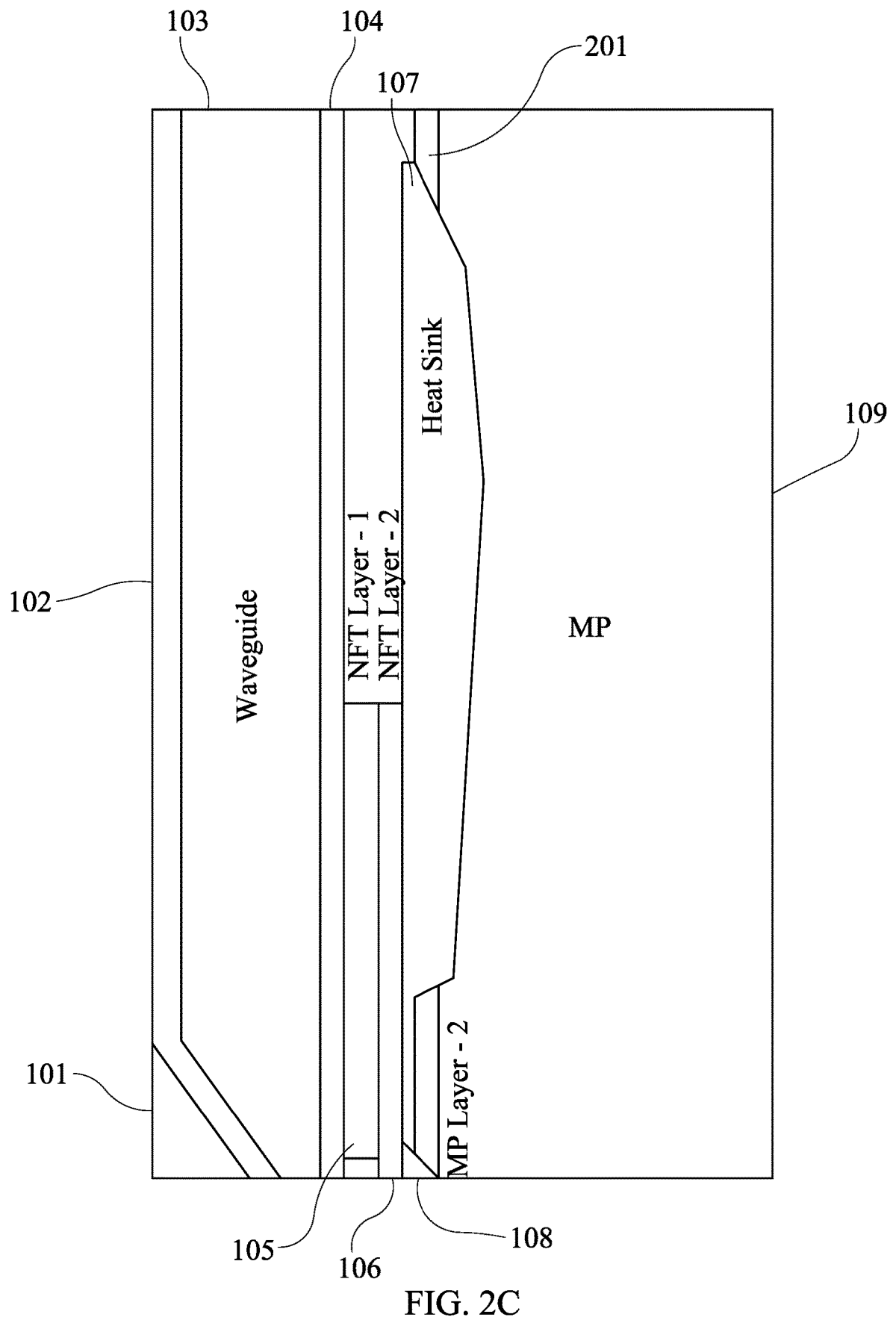

FIGS. 2A-2E depict illustrative optical components for a writer head in accordance with an embodiment.

DETAILED DESCRIPTION

Figure 1A:
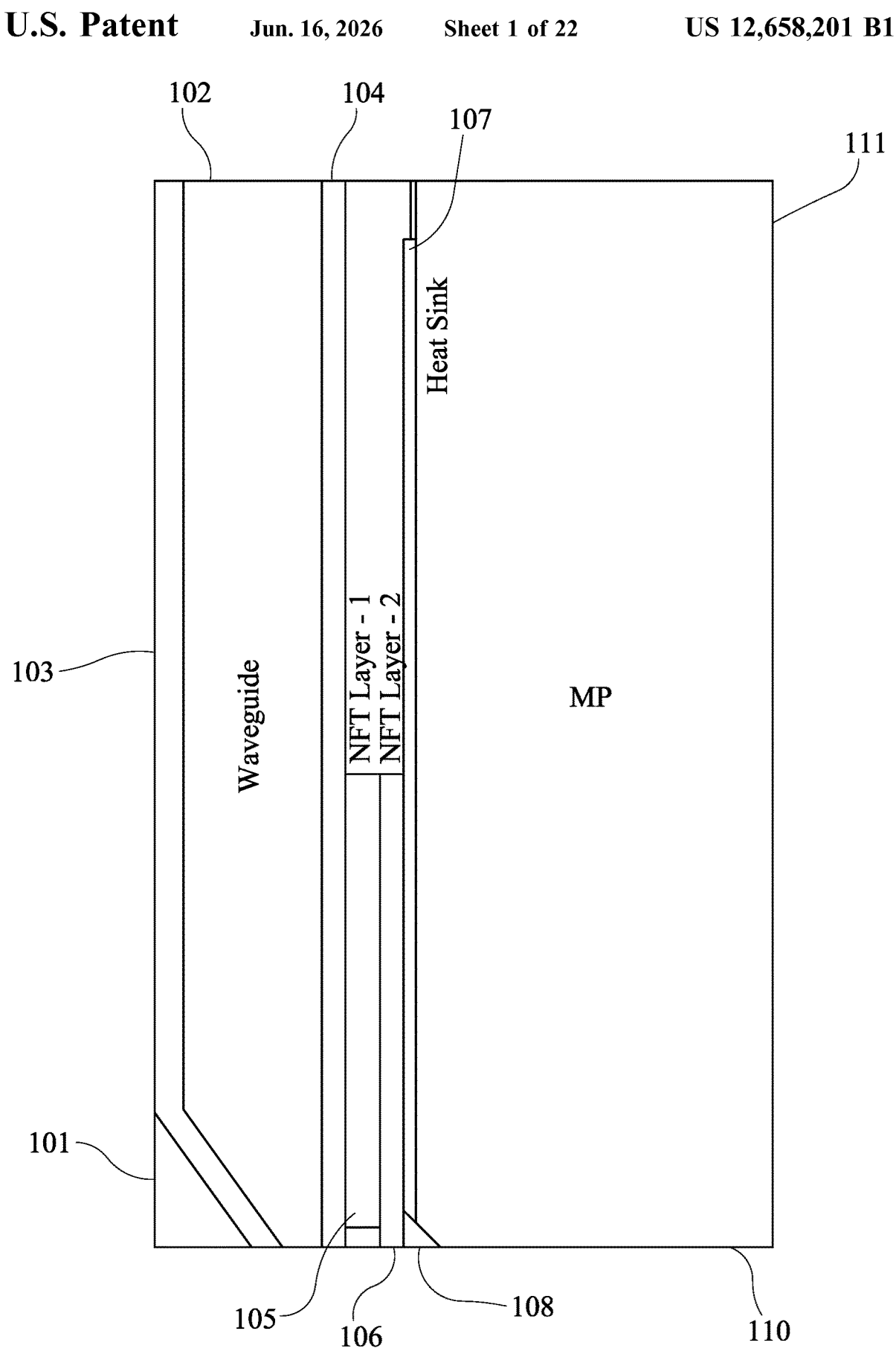

This disclosure is not limited to the systems, devices, and methods described, as they may vary. The terminology used in the description is to describe the particular versions or embodiments only and is not intended to limit the scope.
Products Heat-assisted magnetic recording (HAMR) writer heads may be assembled to assist in the writing of data on recording media. In some embodiments, the writer head comprises an optical component and a magnetic component. The optical component may be configured to apply heat to the recording media to soften the recording media. The magnetic component may be configured to apply a concentrated flux to the heated recording media to write data on the heated recording media. By softening the recording media, the optical component enables the magnetic component to more efficient write data on the recording media. This enables the magnetic component to achieve a higher storage density in the recording media as compared to writer heads without a heating element.

FIGS. 1A-1E depict illustrative optical components for HAMR writer heads. In some embodiments, the optical component is positioned adjacent to a main magnetic pole 109. In some embodiments, the optical component comprises a laser diode configured to generate a beam of light. In some embodiments, the optical component comprises multiple layers. In some embodiments, the optical component comprises a triangular layer 101 comprising a tapered edge. In some embodiments, the triangular layer comprises one of alumina or silica. The tapered angle may be any angle that is effective for generating a target magnetic field. In some embodiments, the tapered angle is about 20 degrees to about 70 degrees. In some embodiments, the tapered angle is about 45 degrees.

In some embodiments, the triangular layer 101 may be a waveguide (WG) blocker layer. The waveguide blocker layer may be configured to prevent diffused light from reaching a recording media. The waveguide blocking layer may comprise any material that substantially prevents diffused light from reaching the recording media. In some embodiments, the waveguide blocking layer comprises ruthenium. In some embodiments, the waveguide blocking layer is positioned near an air-bearing surface (ABS) air-bearing surface 110.

In some embodiments, the optical component further comprises a waveguide layer 102 positioned adjacent to the triangular layer 101. The waveguide layer 102 may be operably connected to a near field transducer (NFT) layer 105, 106 and configured to direct light from the laser diode to the NFT layer 105, 106. In some embodiments, the waveguide layer 102 comprises a tapered section at an angle that extends to or near the air-bearing surface air-bearing surface 110. In some embodiments, the angle of the tapered section is the tapered angle determined by the tapered edge of the triangular layer 101. The waveguide layer 102 may further comprise a flat section substantially parallel to a back part of the main magnetic pole 109. In some embodiments, the waveguide layer 102 comprises a thickness of about 50 nm to about 200 nm. In some embodiments, the waveguide layer 102 comprises a thickness of about 120 nm.

In some embodiments, the thickness of the waveguide layer 102 is expressed as a ratio of the thickness of the waveguide layer 102 to an average grain diameter of a recording media. In some embodiments, the ratio of the thickness of the waveguide layer 102 to the average grain diameter of the recording media is about 7 to about 29.

In some embodiments, the optical component may further comprise a first cladding layer 103 positioned between the waveguide layer 102 and the triangular layer 101 and configured to couple the waveguide layer 102 and the triangular layer. In some embodiments, the first cladding layer 103 is positioned along the entire length of the waveguide layer 102. In some embodiments, the first cladding layer 103 is positioned along a portion of the waveguide layer 102. In some embodiments, the first cladding layer 103 is positioned near the air-bearing surface air-bearing surface 110. The first cladding layer 103 may comprise any material known to one of skill in the art effective for coupling the waveguide layer 102 and the triangular layer 101. In some embodiments, the first cladding layer 103 comprises an insulator. In some embodiments, the first cladding layer 103 comprises a dielectric material. In some embodiments, the first cladding layer 103 comprises a thickness of about 10 nm to about 400 nm. In some embodiments, the first cladding layer 103 comprises a thickness of about 100 nm.

In some embodiments, the thickness of the first cladding layer 103 is expressed as a ratio of the thickness of the first cladding layer 103 to an average grain diameter of a recording media. In some embodiments, the ratio of the thickness of the first cladding layer 103 to the average grain diameter of the recording media is about 1.4 to about 57.

In some embodiments, the optical component may further comprise a second cladding layer 104 positioned between the waveguide layer 102 and the NFT layer 105, 106 and configured to couple the waveguide layer 102 and the NFT layer 105, 106. In some embodiments, the second cladding layer 104 is positioned along the entire length of the waveguide layer 102. In some embodiments, the second cladding layer 104 is positioned along a portion of the waveguide layer 102. In some embodiments, the second cladding layer 104 is positioned near the air-bearing surface air-bearing surface 110. The second cladding layer 104 may comprise any material known to one of skill in the art effective for coupling the waveguide layer 102 and the NFT layer 105, 106. In some embodiments, the second cladding layer 104 comprises an insulator. In some embodiments, the second cladding layer 104 comprises a dielectric material. In some embodiments, the second cladding layer 104 comprises a thickness of about 10 nm to about 400 nm. In some embodiments, the second cladding layer 104 comprises a thickness of about 100 nm.

In some embodiments, the thickness of the second cladding layer 104 is expressed as a ratio of the thickness of the second cladding layer 104 to an average grain diameter of a recording media. In some embodiments, the ratio of the thickness of the second cladding layer 104 to the average grain diameter of the recording media is about 1.4 to about 57.

In some embodiments, the optical component further comprises a near field transducer (NFT) layer 105, 106. The NFT layer 105, 106 may be configured to focus laser-induced plasmons onto the recording media. In some embodiments, the NFT layer 105, 106 may be configured to induce heating at a nano-sized point on the recording media to enable magnetic recording on a narrow track and enable high areal density capacity (ADC). In some embodiments, the NFT layer 105, 106 extends to or near the air-bearing surface air-bearing surface 110. The NFT layer 105, 106 may comprise a flat section substantially parallel to a back part of the main magnetic pole 109. In some embodiments, the NFT layer 105, 106 comprises a thickness of about 17 nm to about 115 nm. In some embodiments, the NFT layer 105, 106 comprises a first NFT layer 105 and a second NFT layer 106.

In some embodiments, the thickness of the NFT layer 105, 106 is expressed as a ratio of the thickness of the NFT layer 105, 106 to an average grain diameter of a recording media. In some embodiments, the ratio of the thickness of the NFT layer 105, 106 to the average grain diameter of the recording media is about 2.5 to about 16.5.

In some embodiments, the first NFT layer 105 comprises a metal with good optical and plasmonic properties. In some embodiments, the first NFT layer 105 comprises one or more of gold, silver, copper, alloys thereof, graphene, and a metal oxide. In some embodiments, the first NFT layer 105 is recessed from the air-bearing surface air-bearing surface 110. In some embodiments, the first NFT layer 105 has a thickness of about 15 nm to about 100 nm.

In some embodiments, the thickness of the first NFT layer 105 is expressed as a ratio of the thickness of the first NFT layer 105 to an average grain diameter of a recording media. In some embodiments, the ratio of the thickness of the first NFT layer 105 to the average grain diameter of the recording media is about 2 to about 14.

In some embodiments, the second NFT layer 106 comprises a robust transition metal. In some embodiments, the second NFT layer 106 comprises one of rhodium or iridium. In some embodiments, the second NFT layer 106 extends to the air-bearing surface air-bearing surface 110. In some embodiments, the second NFT layer 106 has a length of about 0.6 μm to about 1.0 μm. In some embodiments, the second NFT layer 106 has a thickness of about 2 nm to about 15 nm. In some embodiments, the second NFT layer 106 has a thickness of about 5 nm.

In some embodiments, the thickness of the second NFT layer 106 is expressed as a ratio of the thickness of the second NFT layer 106 to an average grain diameter of a recording media. In some embodiments, the ratio of the thickness of the second NFT layer 106 to the average grain diameter of the recording media is about 0.2 to about 2.

The NFT layer 105, 106 may comprises any resistivity effective for focusing laser-induced plasmons onto the recording media. In some embodiments, the NFT layer 105, 106 comprises a resistivity of about 8.0 μΩ*cm to about 20.0 μΩ*cm.

In some embodiments, the optical component further comprises a heat sink layer 107. The heat sink layer 107 may be configured to extract heat from the main magnetic pole 109. The heat sink layer 107 may comprise any material effective for use as a heat sink. In some embodiments, the heat sink layer 107 comprises one or more of gold, ruthenium, aluminum nitride, hexagonal boron nitride, or silicon carbide. In some embodiments, the heat sink layer does not extend to the air-bearing surface air-bearing surface 110. In some embodiments, the heat sink layer 105 comprises a thickness of about 10 nm to about 3 μm depending on the design.

In some embodiments, the thickness of the heat sink layer 107 is expressed as a ratio of the thickness of the heat sink layer 107 to an average grain diameter of a recording media. In some embodiments, the ratio of the thickness of the heat sink layer 107 to the average grain diameter of the recording media is about 1.4 to about 500.

Figure 1B:
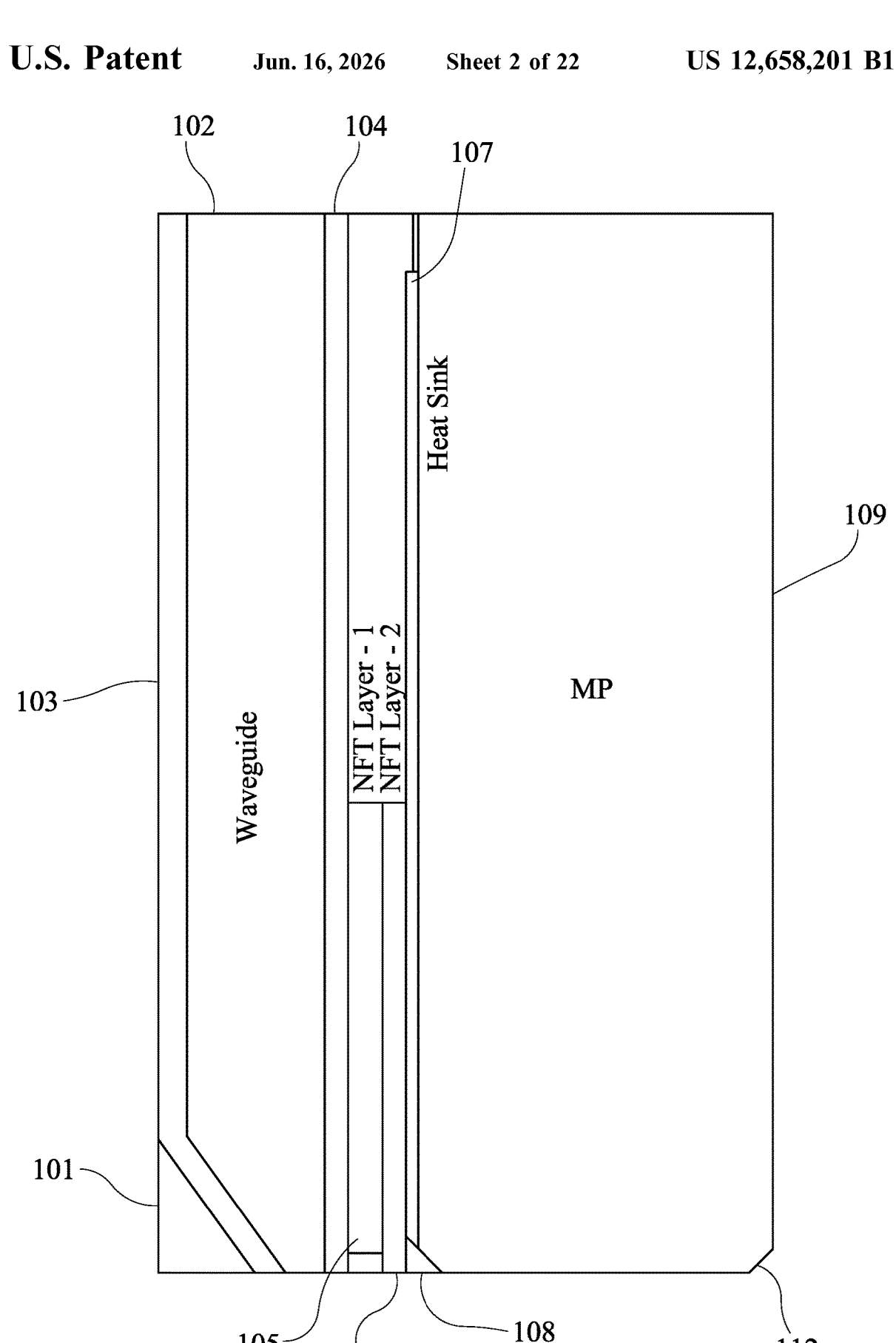
Figure 1C:
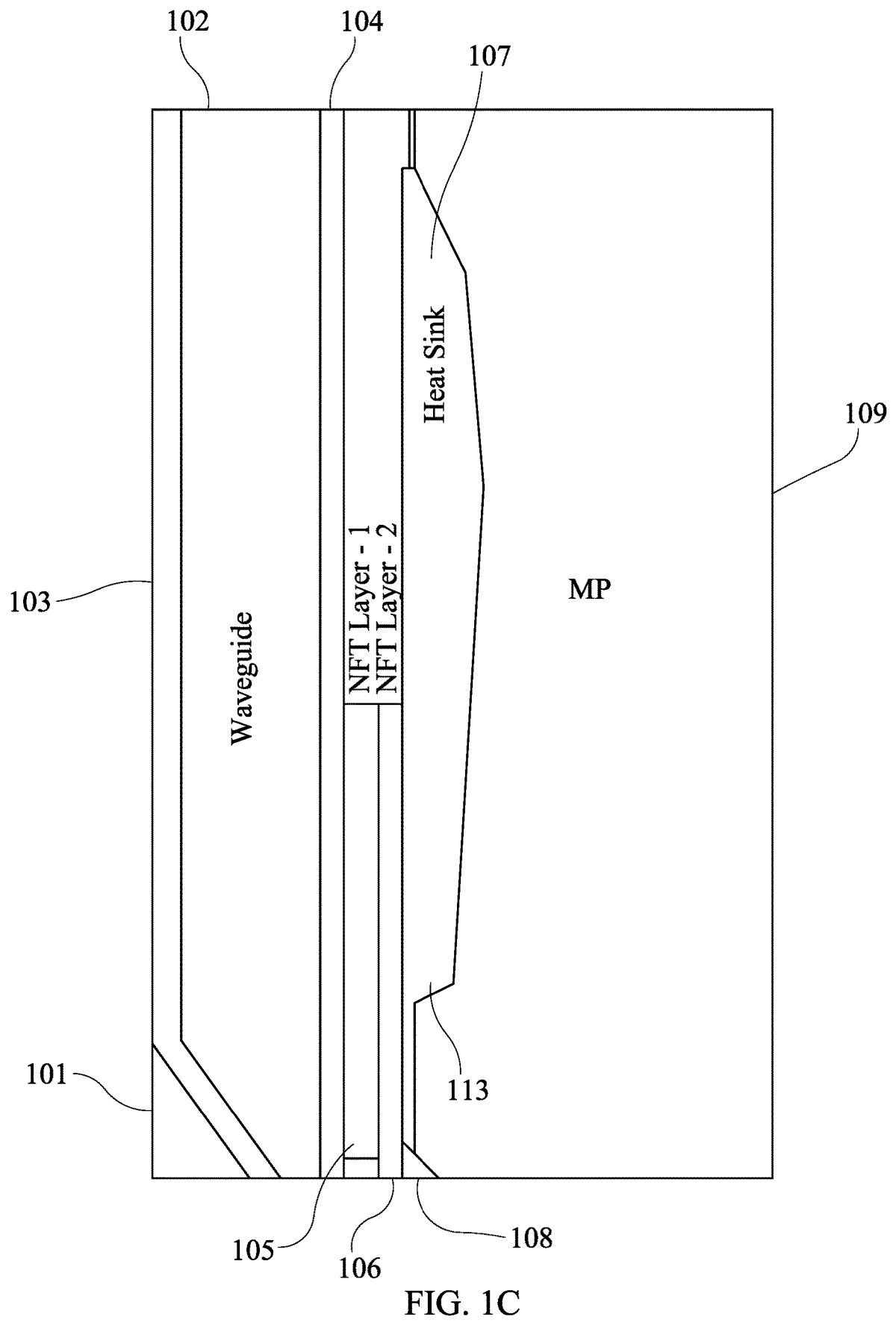
Figure 1D:
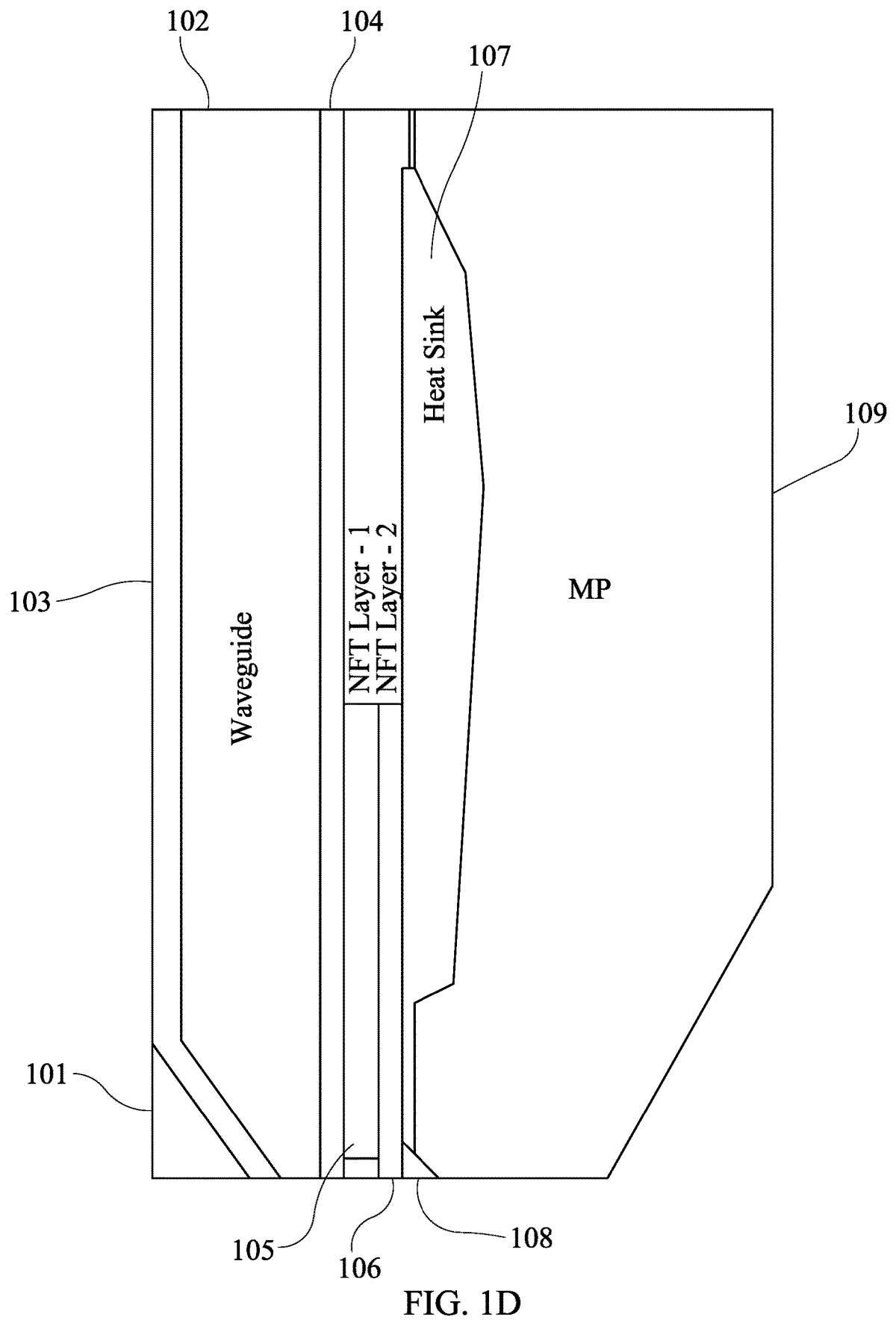
Figure 1E:
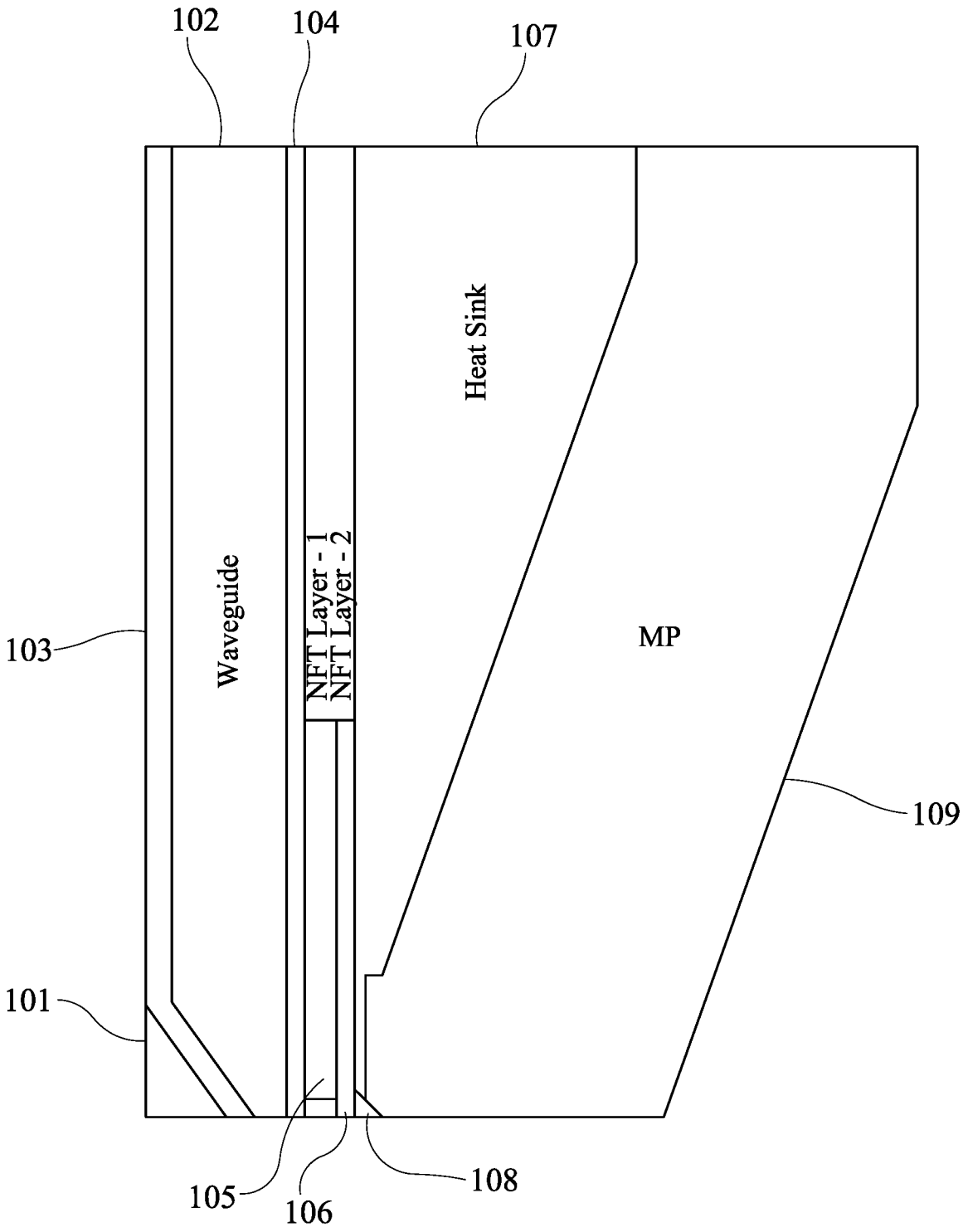
Figure 2A:
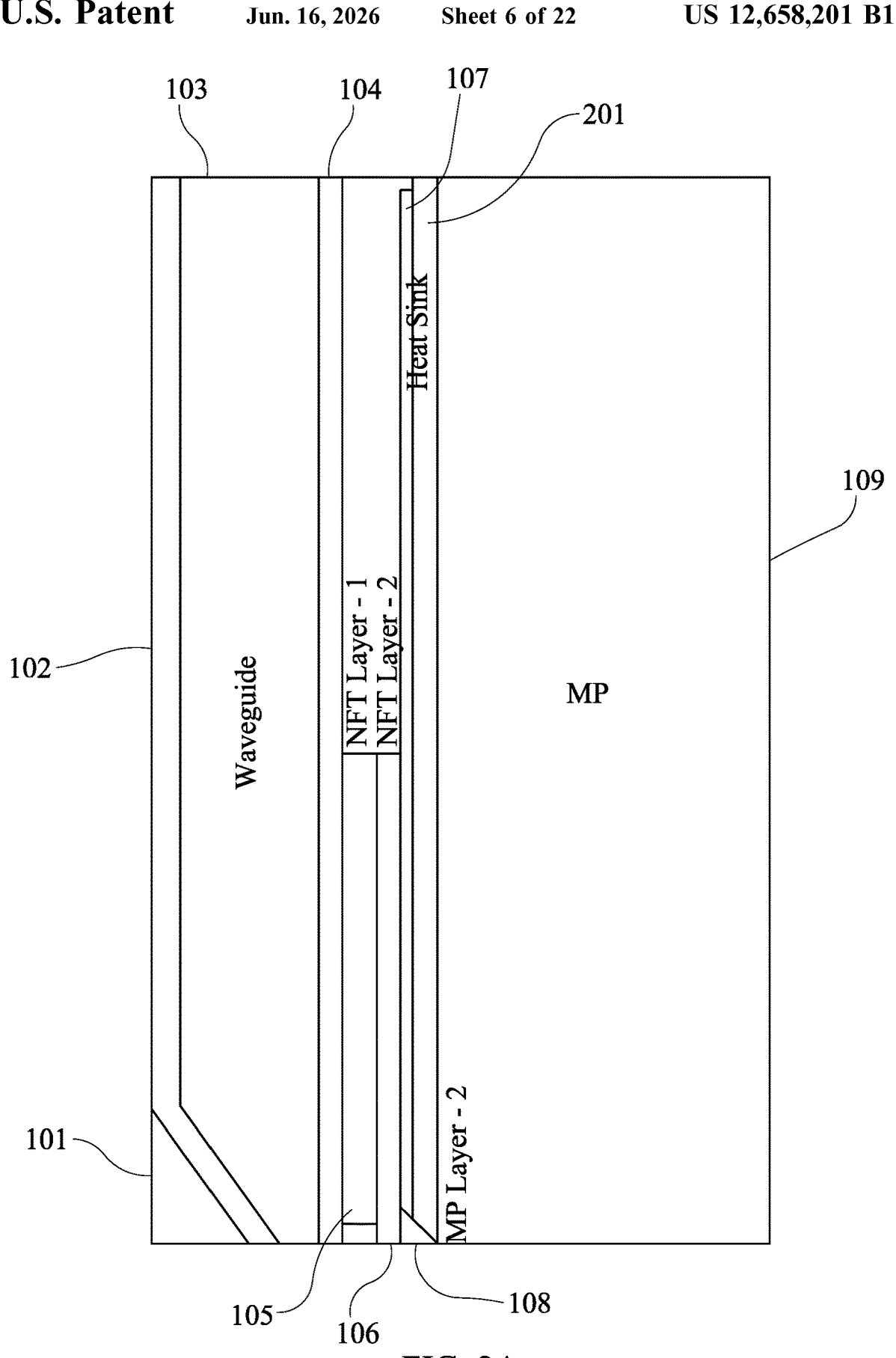
Figure 2B:
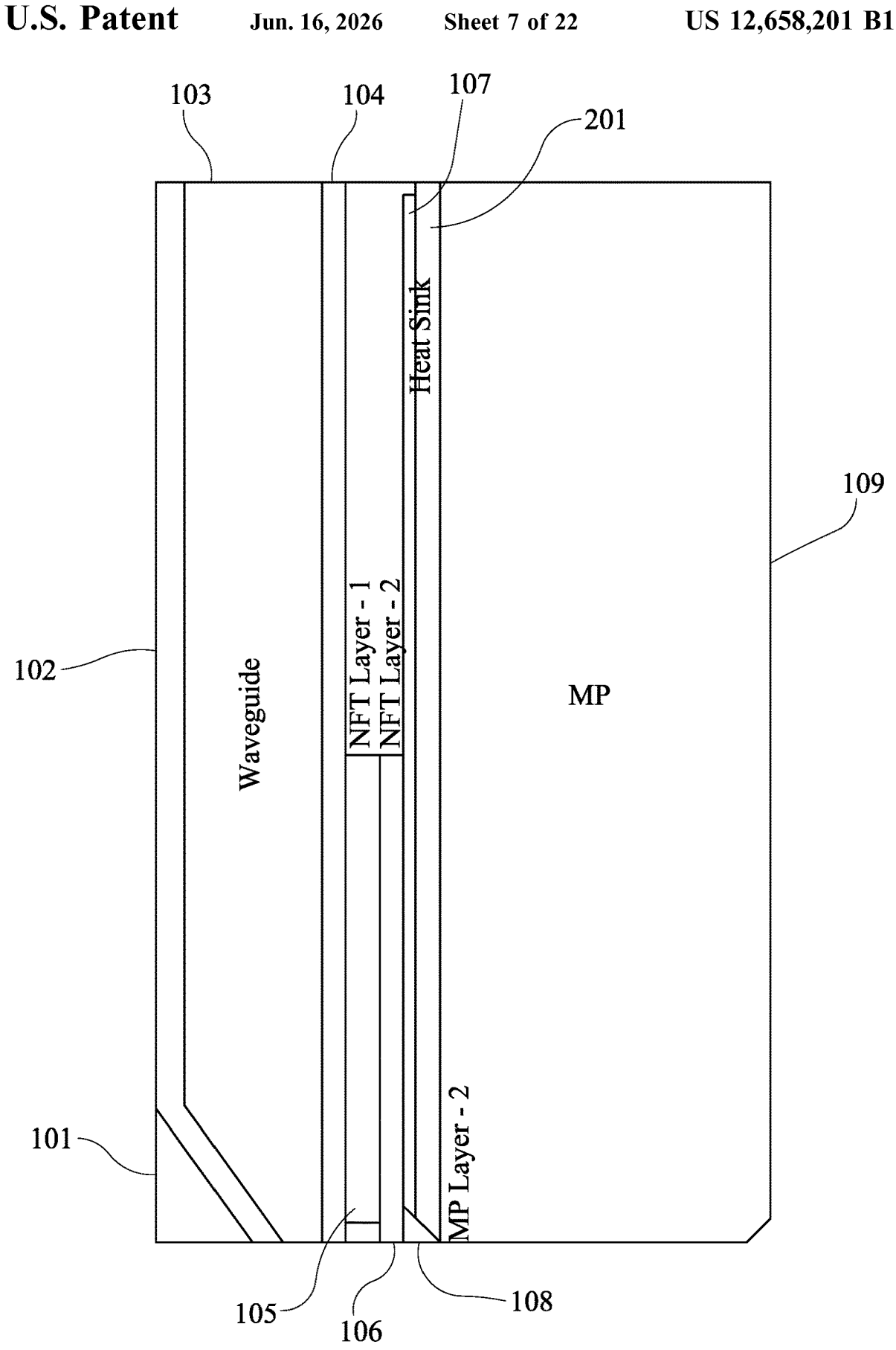
Figure 2D:
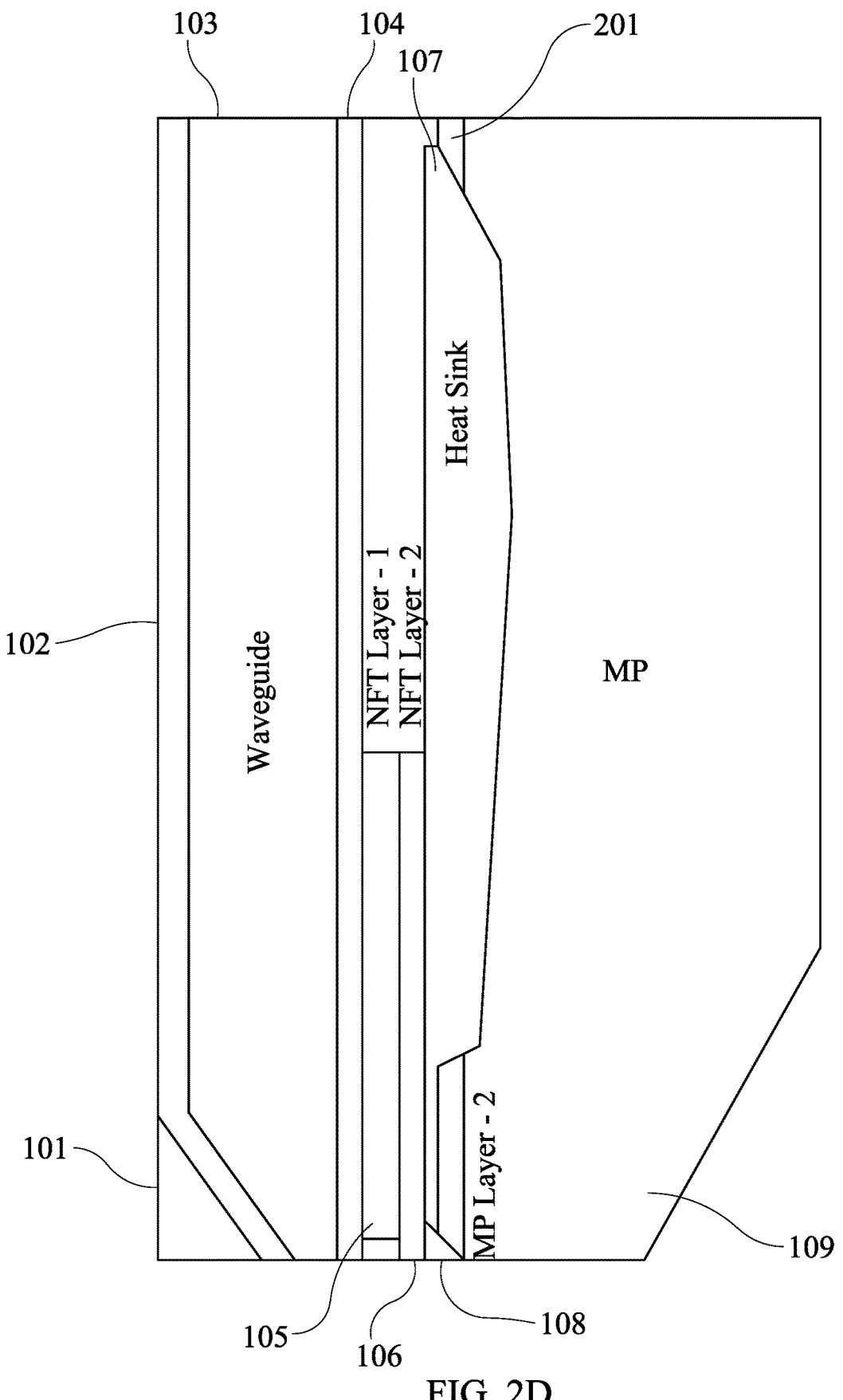
Figure 2E:
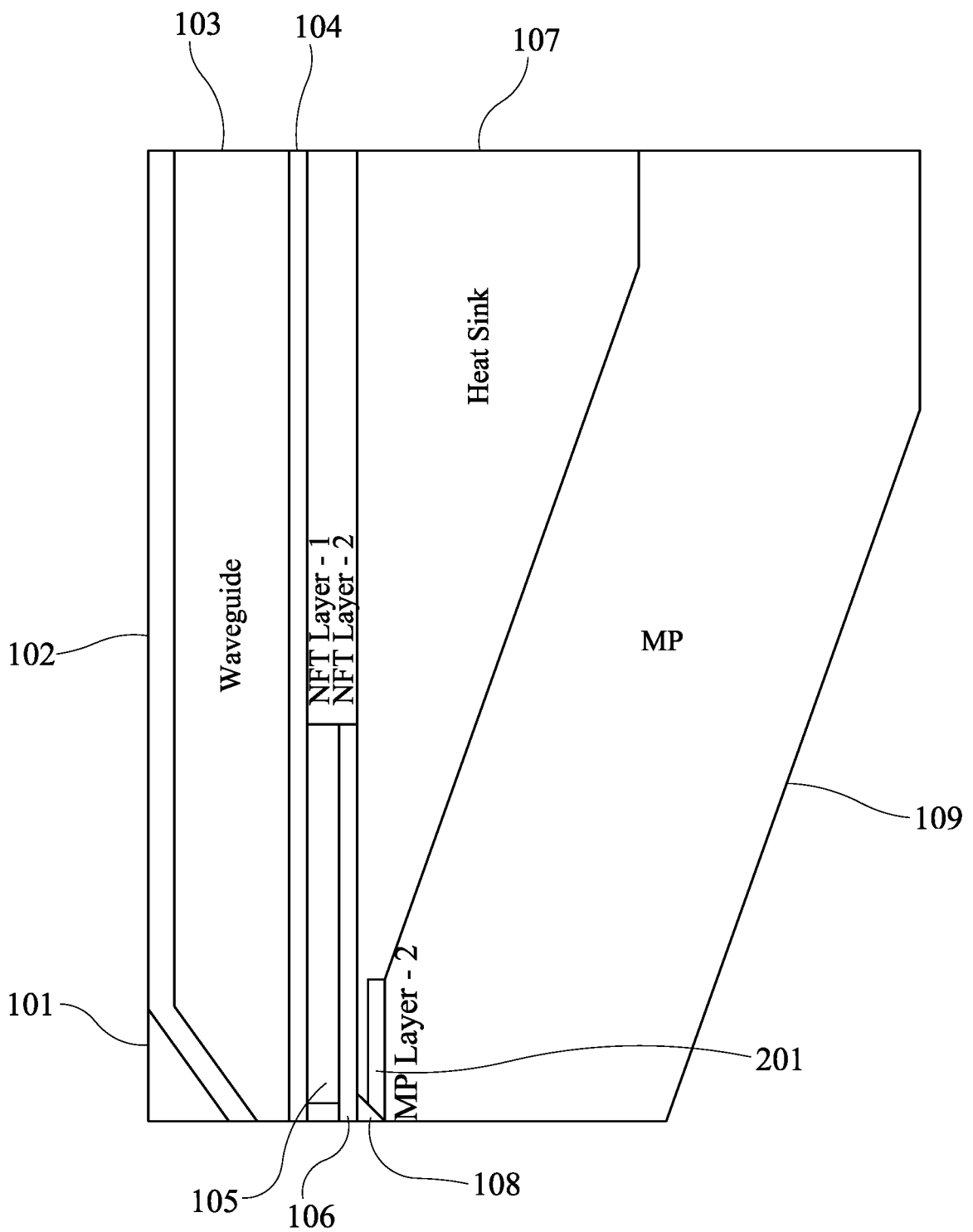

In some embodiments, the heat sink layer 107 comprises a thin, flat layer. FIGS. 1A and 1B depicts illustrative heat sink layer 107 comprising a flat layer. In some embodiments, the flat layer has a uniform thickness. In some embodiments, the heat sink layer 107 comprises a layer that is thin near the air-bearing surface 110 and expands as the heat sink layer 107 extends through the optical component to create a split yoke design for the main magnetic pole 109. FIGS. 1C and 1D illustrate an optical component comprising a split yoke design. In some embodiments, the heat sink layer 107 comprises a first section comprising a thin layer a second section comprising a tapered angle to create a sloped main pole design for the main magnetic pole 109. In such an embodiment, the second section may comprise a tapered angle of about –15 degrees to about –45 degrees. In such an embodiment, the second section may comprise a tapered angle of about –30 degrees. FIG. 1E depicts an illustrative heat sink layer 107 comprising a first section comprising a thin layer a second section comprising a tapered angle to create a sloped main pole design.

In some embodiments, the optical component further comprises a triangular peg gap layer 108 comprising an insulator. In some embodiments, the triangular peg gap layer 108 is configured to insulate the optical component from the main magnetic pole 109 near the air-bearing surface 110. In some embodiments, the triangular peg gap layer 108 comprises one of Ir or Rh. In some embodiments, the triangular peg gap layer 108 is positioned near the air-bearing surface 110. In some embodiments, the peg layer 106 is configured to separate the NFT layer 105, 106 from the main magnetic pole 109 near the air-bearing surface 110. The use of a triangular peg gap layer that physically separates the optical component from the main magnetic pole 109 near the air-bearing surface 110 but does not separate the heat sink layer 107 from the main magnetic pole 109 provides improvements in the properties of the writer head. In some embodiments, the peg gap layer 108 provides a variable peg gap, with the peg gap being the largest at the air-bearing surface 110 and decreasing as the peg gap layer 108 extends into the optical component. In some embodiments, the peg gap layer 108 does not comprise a material and is formed from an absence of material in the main magnetic pole 109. In some embodiments, the optical component comprises a second oxide layer positioned between the peg gap layer 108 and the heat sink layer 107.

In some embodiments, the peg gap layer 108 has a height of about 30 nm to about 100 nm. In some embodiments, the peg gap layer 108 has a height of about 50 nm. In some embodiments, the height of the peg gap layer 108 is expressed as a ratio of the height of the peg layer 108 to an average grain diameter of a recording media. In some embodiments, the ratio of the height of the peg layer 108 to the average grain diameter of the recording media is about 4 to about 14.

The improved properties include an increase in the magnetic field at the recording location, a decrease in the magnetic field angle at the recording location, and a decrease in main pole temperature during recording as compared to a writer head comprising a peg gap layer that extends through the optical component and insulates the heat sink layer 107 from the main magnetic pole 109. These improvements provide a significant increase in the areal density capacity and an increase in writing efficiency and reliability of the writer head.

In some embodiments, the optical component further comprises a first oxide layer positioned between the NFT layer 105, 106 and the heat sink layer 105. In some embodiments, the first oxide layer is positioned along the entire length of the heat sink layer 107. In some embodiments, the first oxide layer is positioned along a portion of the length of the heat sink layer 107. In some embodiments, the first oxide layer comprises one of silica or alumina. In some embodiments, the first oxide layer comprises a thickness of about 1 nm to about 20 nm.

In some embodiments, the thickness of the first oxide layer is expressed as a ratio of the thickness of the first oxide layer to an average grain diameter of a recording media. In some embodiments, the ratio of the thickness of the first oxide layer to the average grain diameter of the recording media is about 0.1 to about 3.

The main magnetic pole 109 may be configured to apply a concentrated flux to the recording media. The main magnetic pole 109 may comprise any saturation magnetization effective for writing data on the recording media. In some embodiments, the main magnetic pole 109 comprises a material with highest available magnetic moment. In some embodiments, the main magnetic pole 109 comprises a material with high available magnetic moment, such as for example a magnetic moment around, or greater than, about 24 kG. In some embodiments, the main magnetic pole 109 comprises a material with a magnetic moment of about 24 kG.

In some embodiments, the main magnetic pole 109 further comprises a main magnetic pole section extending along the air-bearing surface air-bearing surface 110. In some embodiments, the main magnetic pole section comprises a thickness of about 200 nm to about 800 nm. In some embodiments, the main magnetic pole section comprises a thickness of about 400 nm.

In some embodiments, the thickness of the main magnetic pole section is expressed as a ratio of the thickness of the main magnetic pole section to an average grain diameter of a recording media. In some embodiments, the ratio of the thickness of the main magnetic pole section to the average grain diameter of the recording media is about 28 to about 57.

In some embodiments, the back edge 111 of the main magnetic pole 109 is flat and does not comprise a second tapered section. FIGS. 1A and 1C depict illustrative main magnetic pole 109 comprising a flat back edge. In some embodiments, the main magnetic pole 109 comprises a taper 112 opposite the peg gap layer 108. In some embodiments, the taper 112 comprises a similar shape and angle as the peg gap layer 108. In some embodiments, the angle of the taper 112 is opposite the angle of the peg gap layer 108. FIG. 1B depicts an illustrative main magnetic pole 109 comprising a taper 112.

In some embodiments, the back edge 111 of the main magnetic pole 109 comprises a sloped structure. FIG. 1E depicts a main magnetic pole 109 comprising a sloped structure with a slope angle. The slope angle may be any angle effective for generating a target magnetic field. In some embodiments, the tapered angle is in the opposite direction as the tapered angles present in the layers of the optical component. In some embodiments, the slope angle is about –15 degrees to about –45 degrees. In some embodiments, the slope angle is about –20 degrees. In some embodiments, the surface of the heat sink layer 107 contacting the main magnetic pole 109 comprises a sloped edge, and the slope angle of the back edge 111 of the main magnetic pole 109 comprises the same angle as the sloped edge.

In some embodiments, the surface of the main magnetic pole 109 contacting the heat sink layer 107 may comprise a notch 113. In some embodiments, the notch 113 may comprise a recess into the surface of the main magnetic pole 109. In some embodiments, the notch 113 may be filled with the heat sink layer 107. The notch 113 may start from a predetermined distance from the air-bearing surface 110. In some embodiments, the notch 113 may start at a distance of about 100 nm to about 400 nm. In some embodiments, the notch 113 may start at a distance of about 250 nm from the air-bearing surface 110.

In some embodiments, the main magnetic pole 109 comprises a second magnetic layer 201 positioned on the surface of the main magnetic pole 109 adjacent to the heat sink layer 107. FIGS. 2A-2E depict illustrative optical components wherein the main magnetic pole 109 comprises a second magnetic layer 201. In some embodiments, the second magnetic layer 201 comprises a material with a lower magnetic moment than the remainder of the main magnetic pole 109. In some embodiments, the second magnetic layer 201 comprises one or more of CoFe, NiFe, or CoFeNi. In some embodiments, the second magnetic layer 201 is doped with a dopant comprising a transition metal. In some embodiments, the dopant comprises one or more of palladium or rhenium. In some embodiments, the second magnetic layer 201 comprises a thickness of about 10 nm to about 100 nm. In some embodiments, the second magnetic layer 201 comprises a thickness of about 20 nm.

In some embodiments, the thickness of the second magnetic layer 201 is expressed as a ratio of the thickness of the second magnetic layer 201 to an average grain diameter of a recording media. In some embodiments, the ratio of the thickness of the second magnetic layer 201 to the average grain diameter of the recording media is about 1.4 to about 14.

FIGS. 3A-3J depict illustrative writer heads for HAMR devices. In some embodiments, the writer head comprises an optical component 301. The optical component may be any optical component 301 described above. The optical component 301 may be positioned adjacent to a main magnetic pole 302. In some embodiments, the optical component 301 is positioned on the bottom of the main magnetic pole 302. The main magnetic pole 302 may be the main magnetic pole 109 described above. In some embodiments, the optical component 301 and the main magnetic pole 302 extend to an air-bearing surface 311. In some embodiments, the writer head comprises a first return pole 303 configured to enable the flux from the main magnetic pole 302 to complete a loop. In some embodiments, the first return pole 303 extends to the air-bearing surface 311.

The distance between the main magnetic pole 302 and the first return pole 303 may be selected to maximize the magnetic field at a recording point on the recording media. In some embodiments, the first return pole 303 is positioned on a side of the main magnetic pole 302 opposite the optical component 301. In such embodiments, the distance between the first return pole 303 and the main magnetic pole 302 is not limited by the optical component 301. In some embodiments, the distance between the main magnetic pole 302 and the first return pole 303 is about 50 nm to about 1,000 nm. In some embodiments, the distance between the main magnetic pole 302 and the first return pole 303 is about 500 nm.

The first return pole 303 may have any thickness 313 effective for enabling the flux from the main magnetic pole 302 to complete a loop. In some embodiments, the first return pole 303 comprises a thickness of about 500 nm to about 1,500 nm. In some embodiments, the first return pole 303 comprises a magnetic material with a saturation magnetization lower than that of the main magnetic pole 302. In some embodiments, the first return pole 303 comprises a saturation magnetization of about 10 kG to about 22 kG. In some embodiments, the first return pole 303 comprises a saturation magnetization of about 19 kG.

In some embodiments, the first return pole 303 comprises a first pedestal 305 configured to determine the distance between the first return pole 303 and the main magnetic pole 302. In some embodiments, the first pedestal 305 is positioned adjacent to the air-bearing surface 311. In some embodiments, the first pedestal 305 has a thickness 212 of about 1.5 µm to about 2.5 µm. In some embodiments, the first pedestal 305 has a thickness 212 of about 1 µm. In some embodiments, the first pedestal 305 has a height 316 of about 200 nm to about 1,000 nm. In some embodiments, the first pedestal 305 has a height 316 of about 300 nm. In some embodiments, the first pedestal 305 comprises a magnetic material with a saturation magnetization lower than that of the main magnetic pole 302. In some embodiments, the first pedestal 305 comprises a saturation magnetization of about 10 kG to about 22 kG. In some embodiments, the first pedestal 305 comprises a saturation magnetization of about 19 kG.

In some embodiments, the first return pole 303 comprises a magnetic leading shield (MLS) 309 positioned adjacent to the air-bearing surface 311. In some embodiments, the magnetic leading shield 309 has a thickness 212 of about 0.1 µm to about 1 µm. In some embodiments, the magnetic leading shield 309 has a thickness 212 of about 0.5 µm. In some embodiments, the magnetic leading shield 309 has a height 316 of about 500 nm to about 2,000 nm. In some embodiments, the magnetic leading shield 309 has a height 316 of about 800 nm.

In some embodiments, the first return pole 303 may be operably connected to the main magnetic pole 302 by a first connector 304. In some embodiments, the first connector 304 comprises a magnetic material with a saturation magnetization lower than that of the main magnetic pole 302. In some embodiments, the first connector 304 comprises a saturation magnetization of about 10 kG to about 22 kG. In some embodiments, the first connector 304 comprises a saturation magnetization of about 19 kG.

Figure 3A:
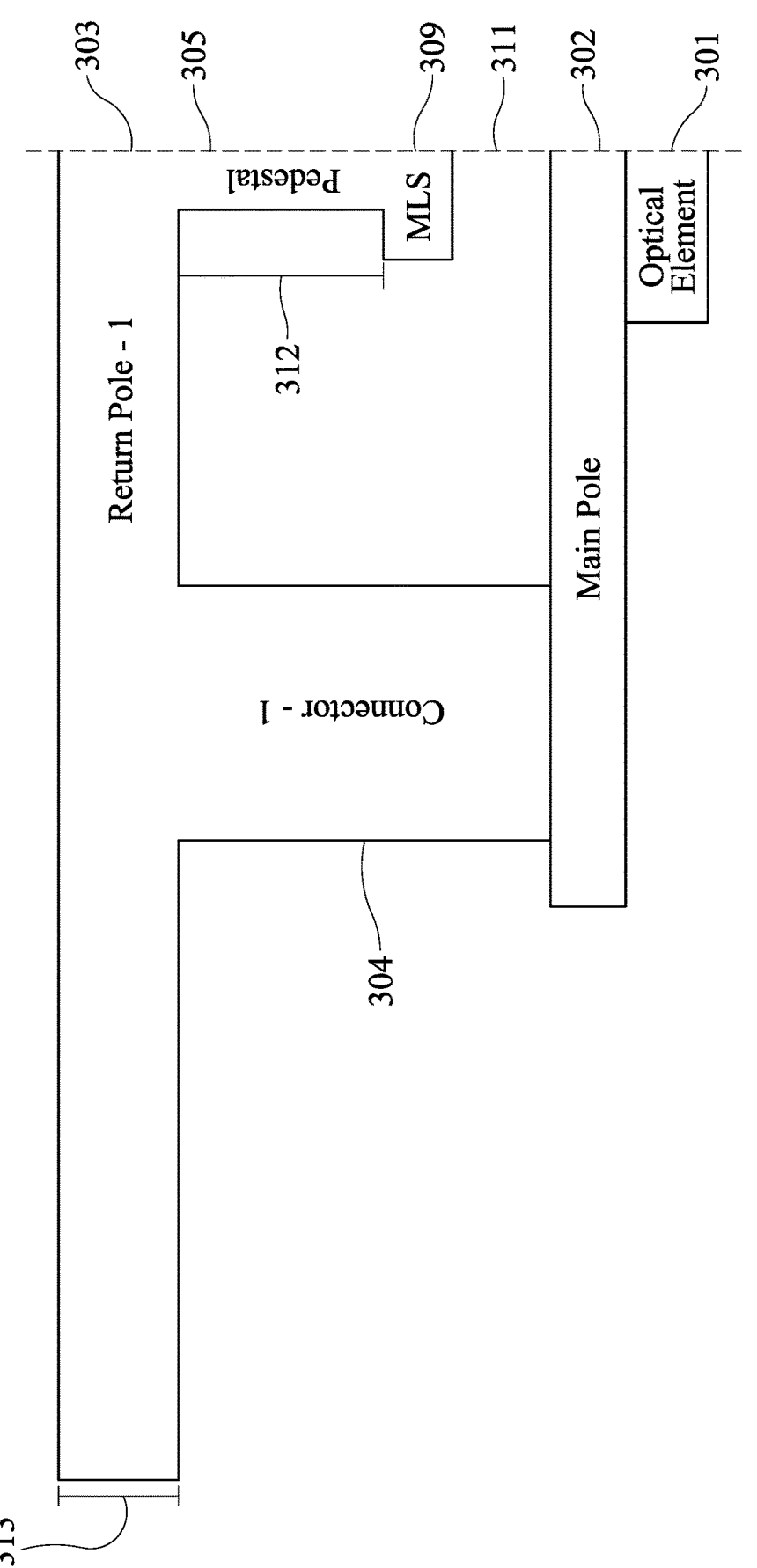
FIGS. 3A-3J depict illustrative writer heads in accordance with an embodiment.
Figure 3B:
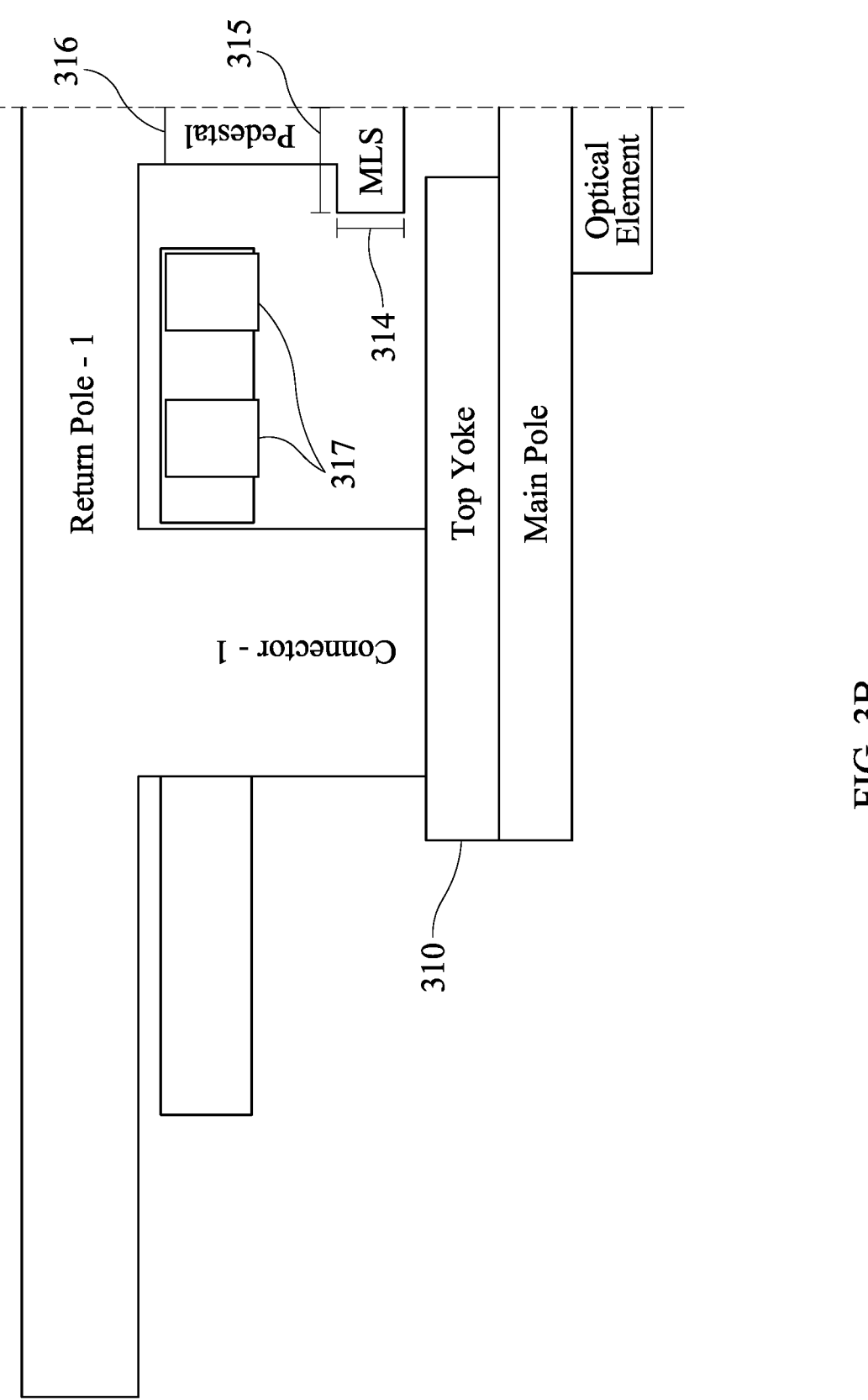
Figure 3C:
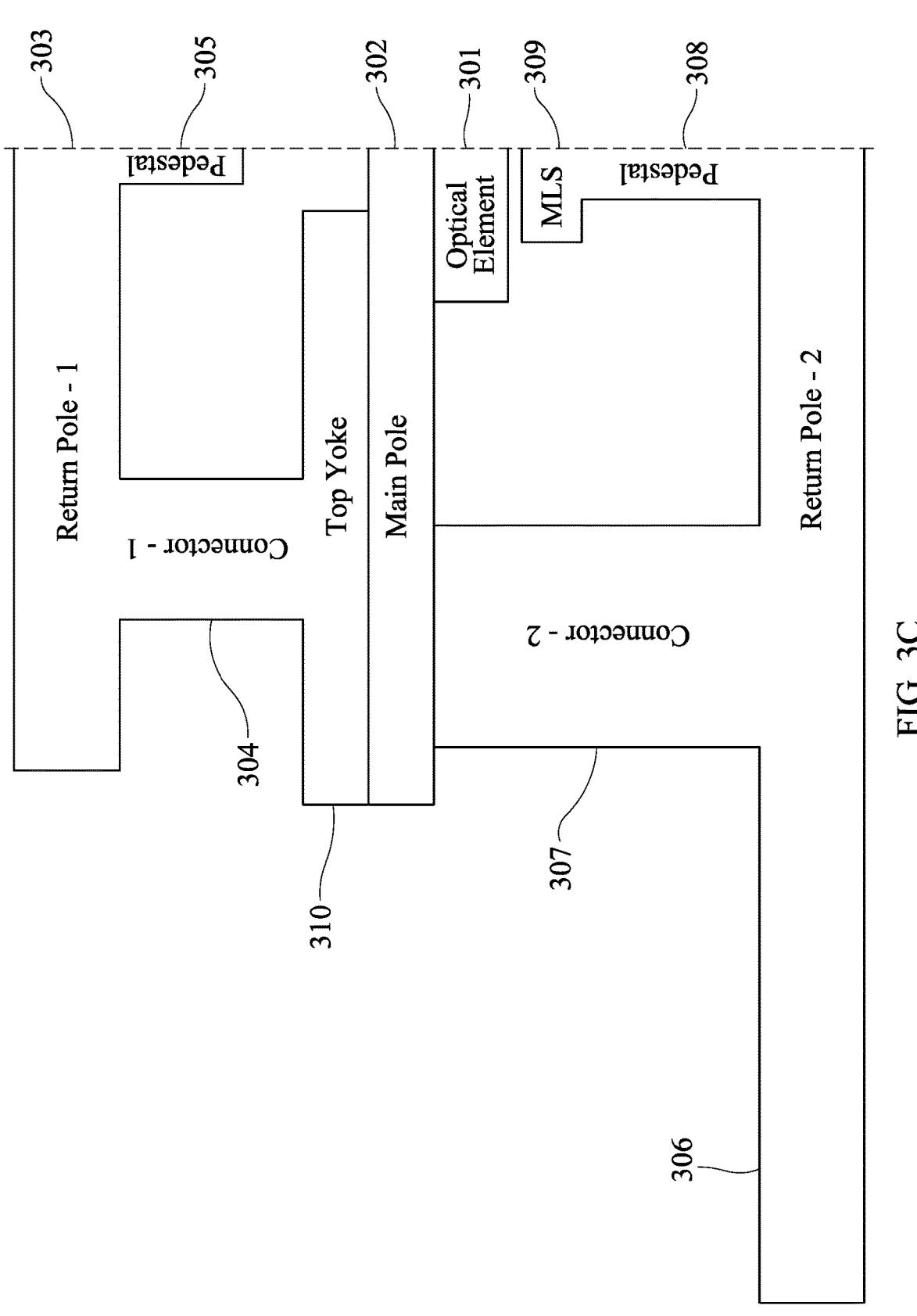
Figure 3D:
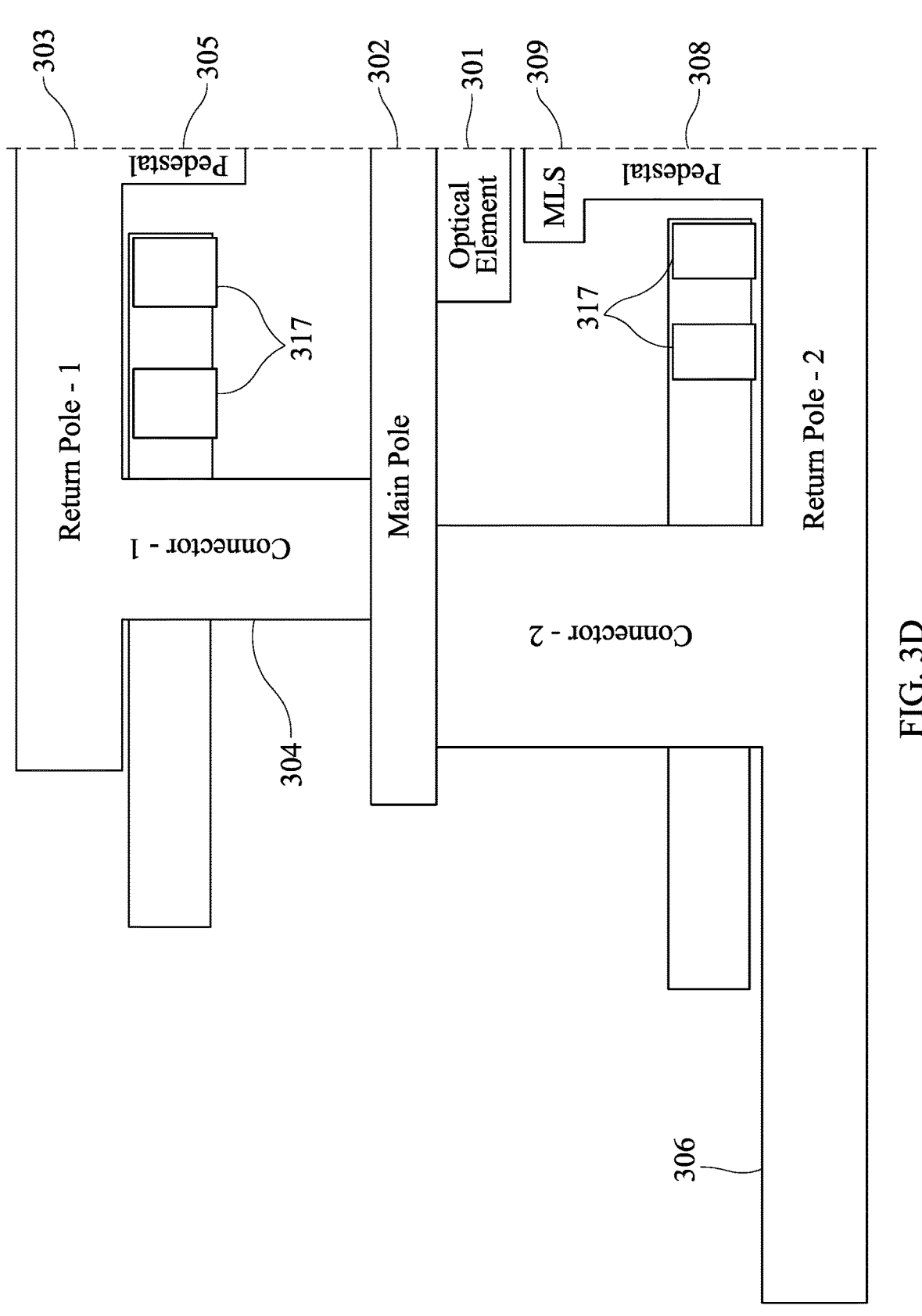
Figure 3E:
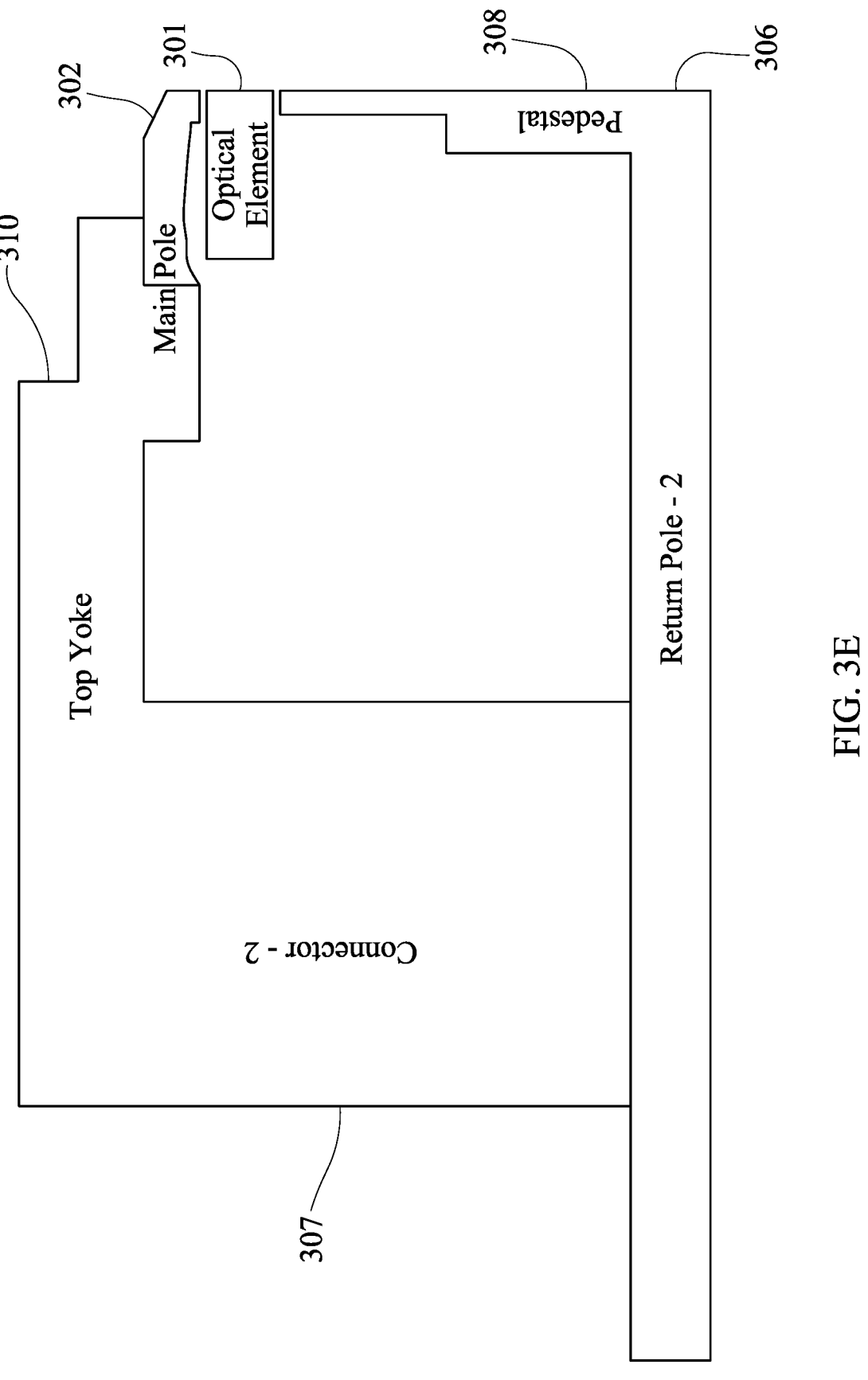
Figure 3F:
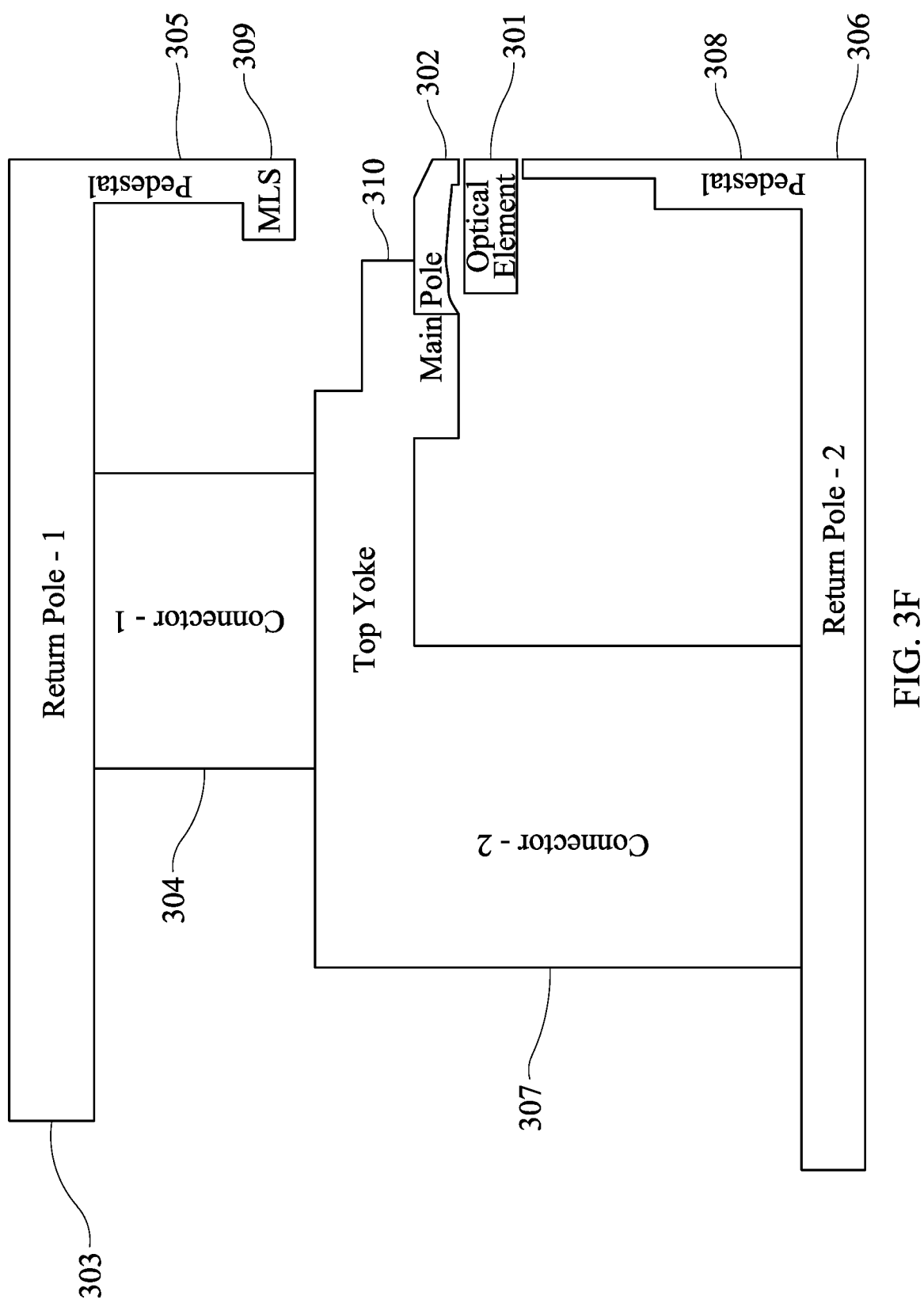
Figure 3G:
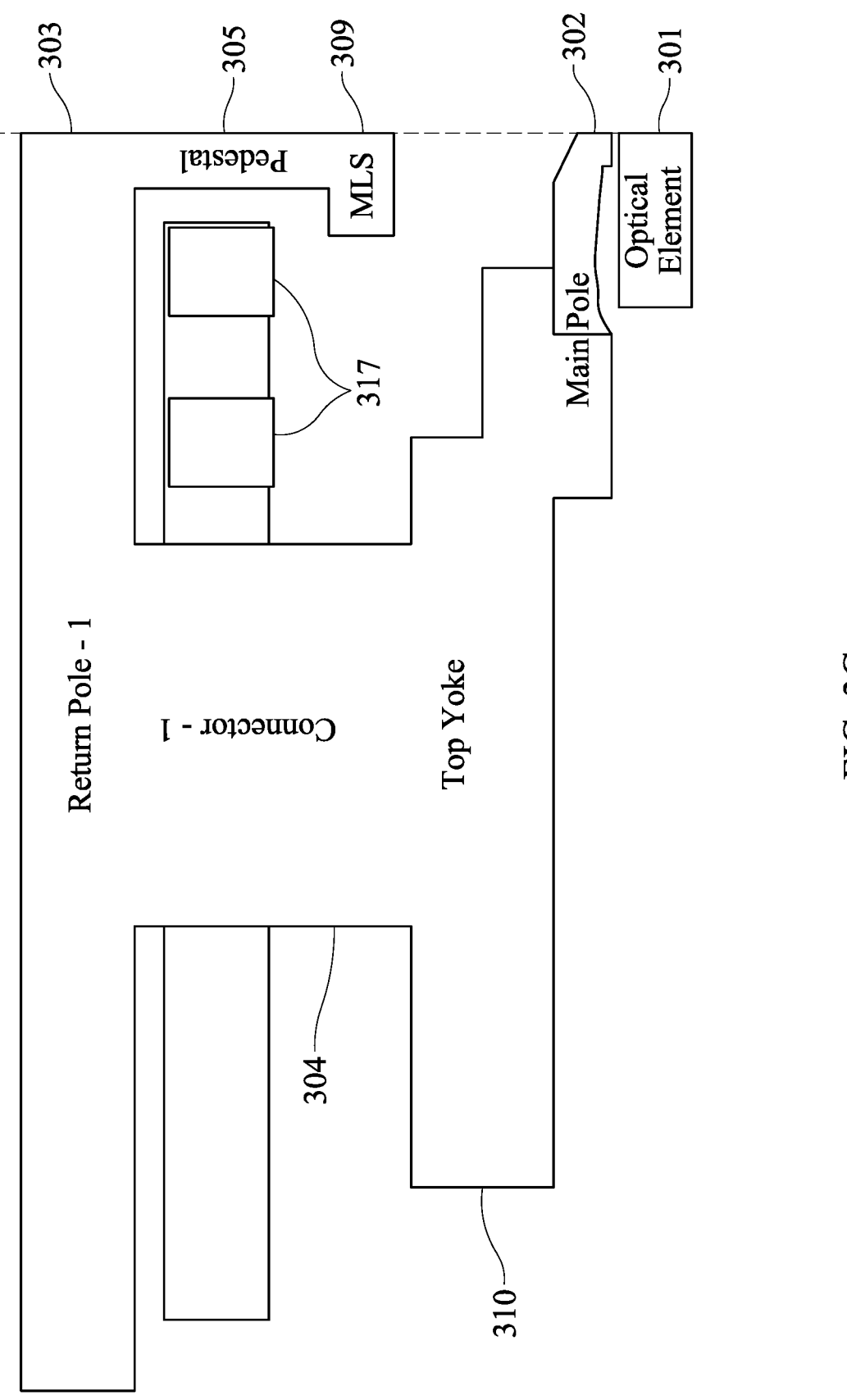

FIGS. 3E to 3G depict a magnetic pole 302 does not extend to the first connector 304. In such an embodiment, the main magnetic pole 302 may have a length of about 0.5 µm to about 4.0 µm. In such an embodiment, the main magnetic pole 302 may have a length of about 2 µm. In such an embodiment, the main magnetic pole 302 further comprises a top yoke 310 configured to assist in controlling the flux concentration on the back of the main magnetic pole 302. In some embodiments, the top yoke 310 is recessed from the air-bearing surface 311. In some embodiments, the top yoke 310 comprises a magnetic material with a saturation magnetization lower than that of the main magnetic pole 302. In some embodiments, the top yoke 310 comprises a saturation magnetization of about 10 kG to about 22 kG. In some embodiments, the top yoke 310 comprises a saturation magnetization of about 19 kG. In some embodiments, the first return pole 303 is operably connected to the top yoke 310 by the first connector 304.

Figure 3H:
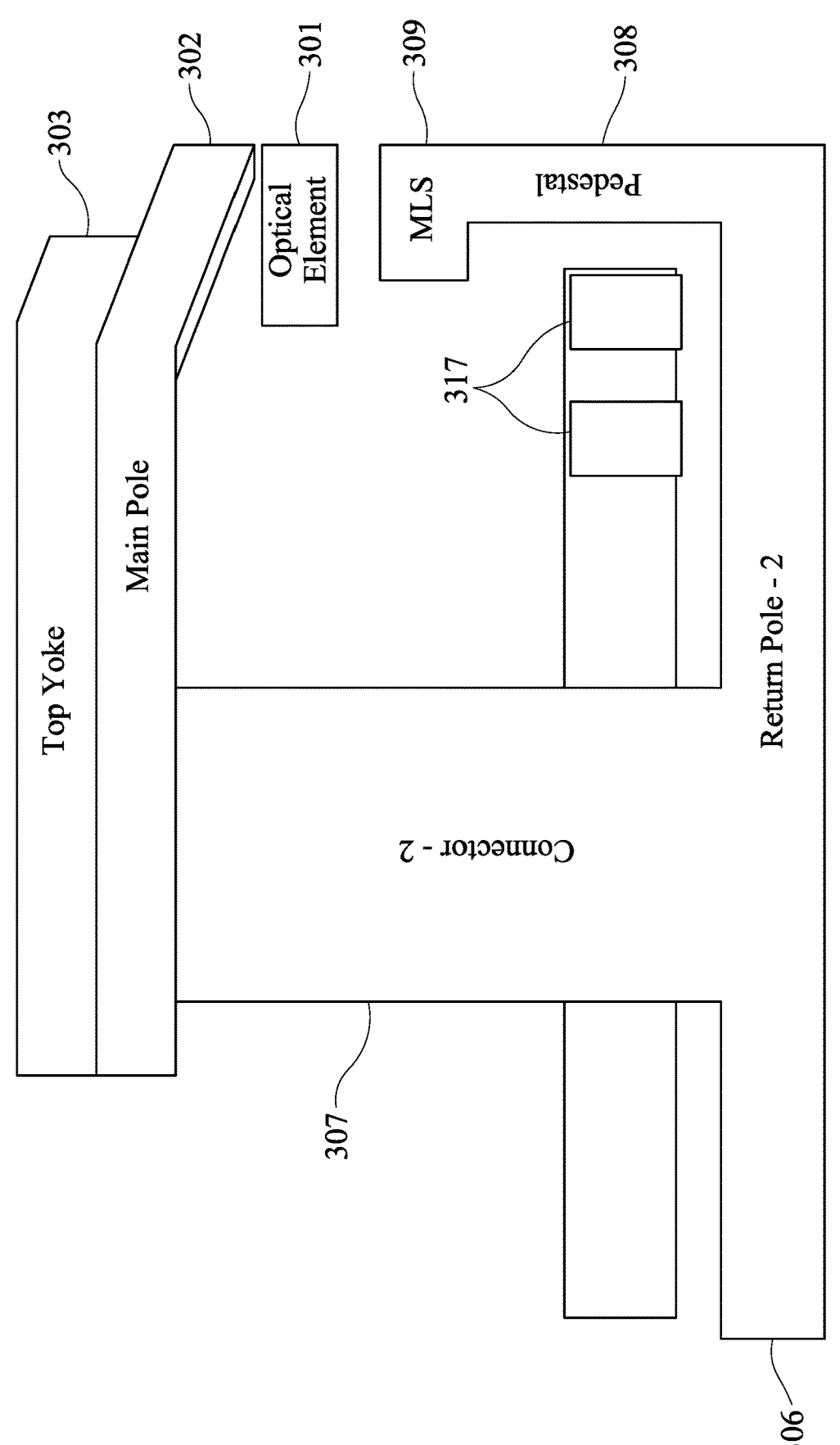
Figure 3I:
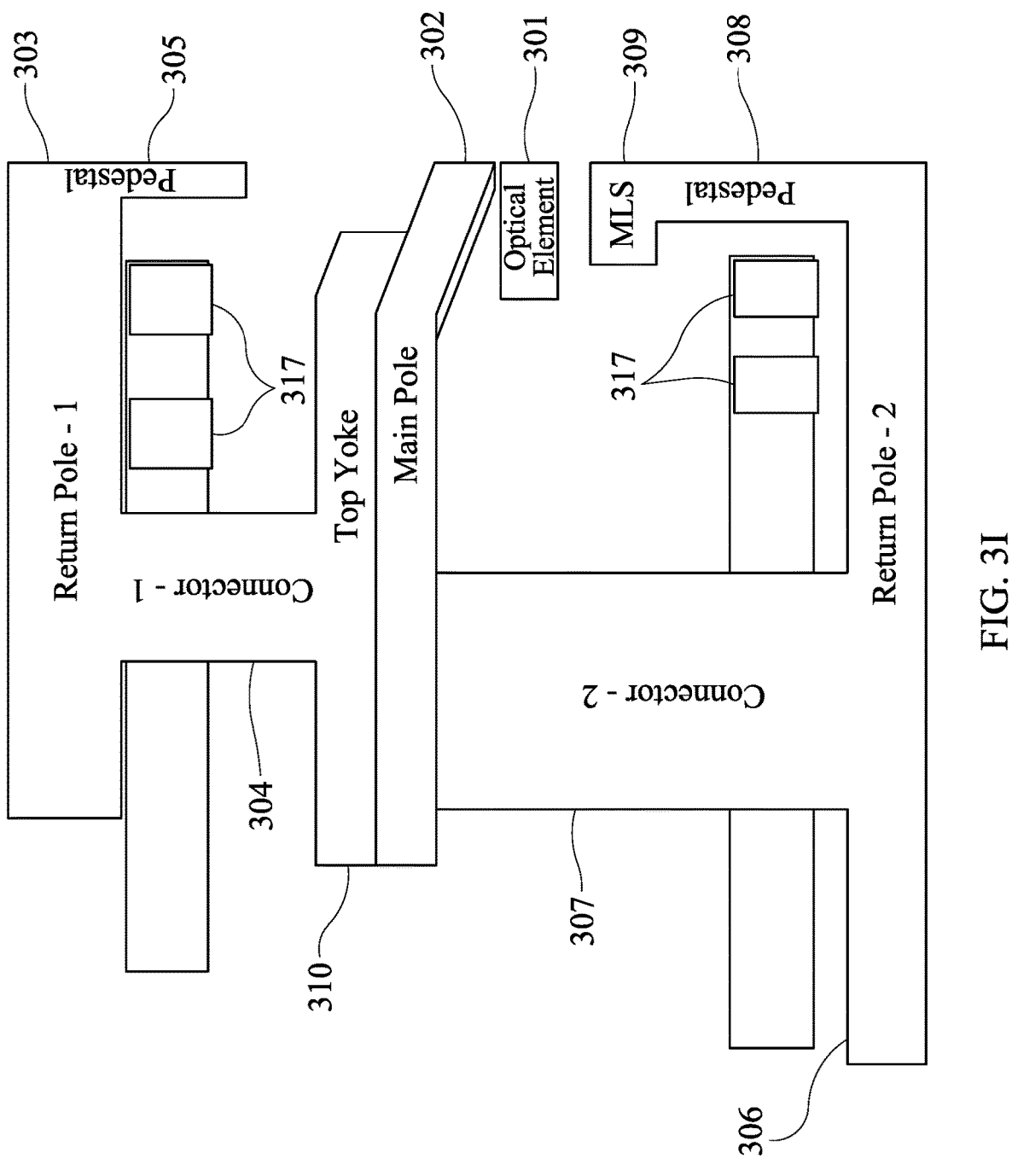
Figure 3J:
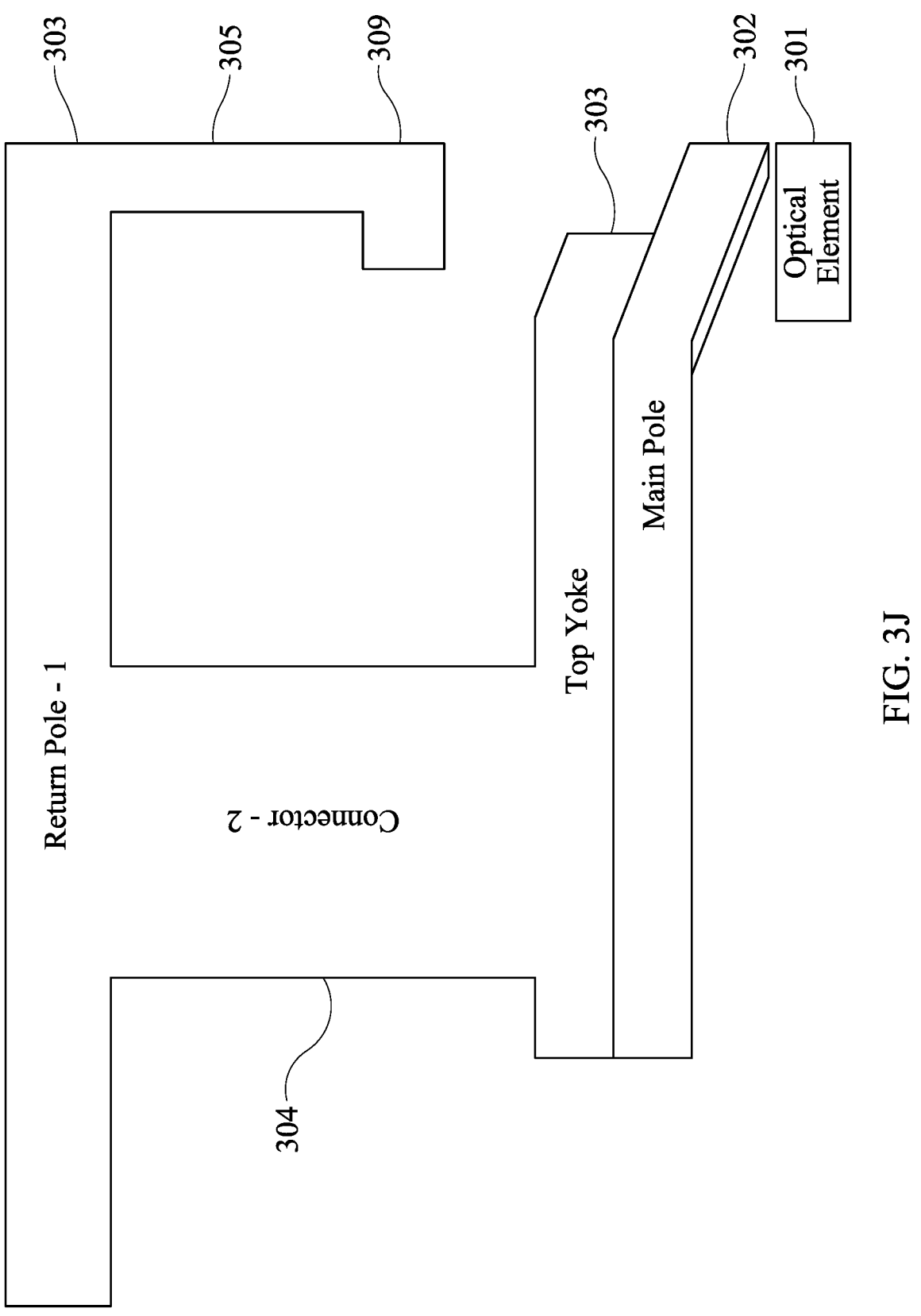

In some embodiments, the main magnetic pole 302 comprises a sloped back edge. In such an embodiment, the top yoke 310 may comprise a sloped back edge. FIGS. 3H-3J depict illustrative magnetic main poles 302 comprising a sloped back edge. In such an embodiments, the main magnetic pole 302 may comprises a sloped section with a length of about 0.5 µm to about 3.0 µm. In such an embodiments, the main magnetic pole 302 may comprises a sloped section with a length of about 1.5 µm. In some embodiments, the sloped back edge may comprise an angle of about −15 degrees to about −45 degrees. In some embodiments, the sloped back edge may comprise an angle of about −20 degrees.

In some embodiments, the writer head further comprises at least one coil 317 configured to conduct a current and provide a magnetomotive force to the writer head. In some embodiments, the at least one coil 317 is positioned between the optical component 301 and the first return pole 303. The at least one coil may comprise any number of loops effective for providing a magnetomotive force to the writer head. In some embodiments, the at least one coil 317 comprises loops numbering from 1 to 6.

In some embodiments, the writer head comprises a second return pole 306 configured to enable the flux from the main magnetic pole 302 to complete a loop. In some embodiments, the second return pole 306 extends to the air-bearing surface 311. The distance between the main magnetic pole 302 and the second return pole 306 may be selected to maximize the magnetic field at a recording point on the recording media. In some embodiments, the second return pole 306 is positioned on the same side of the main magnetic pole 302 as the optical component 301. In such embodiments, the distance between the second return pole 306 and the main magnetic pole 302 is limited by the optical component 301. In some embodiments, the distance between the main magnetic pole 302 and the second return pole 306 is about 100 nm to about 1000 nm. In some embodiments, the distance between the main magnetic pole 302 and the second return pole 306 is about 800 nm.

The second return pole 306 may have any thickness 313 effective for enabling the flux from the main magnetic pole 302 to complete a loop. In some embodiments, the thickness of the second return pole 306 is limited by the position of the optical component 301. In some embodiments, the second return pole 306 comprises a thickness of about 100 nm to about 1,500 nm. In some embodiments, the second return pole 306 comprises a thickness of about 500 nm. In some embodiments, the second return pole 306 comprises a magnetic material with a saturation magnetization lower than that of the main magnetic pole 302. In some embodiments, the second return pole 306 comprises a saturation magnetization of about 10 kG to about 22 kG. In some embodiments, the second return pole 306 comprises a saturation magnetization of about 19 kG.

In some embodiments, the second return pole 306 comprises a second pedestal 208 configured to determine the distance between the second return pole 306 and the main magnetic pole 302. In some embodiments, the second pedestal 208 is positioned adjacent to the air-bearing surface 311. In some embodiments, the second pedestal 208 has a thickness 212 of about 1.5 µm to about 2.5 µm. In some embodiments, the second pedestal 208 has a thickness 212 of about 2 µm. In some embodiments, the second pedestal 208 has a height 316 of about 200 nm to about 1,000 nm. In some embodiments, the second pedestal 208 comprises a magnetic material with a saturation magnetization lower than that of the main magnetic pole 302. In some embodiments, the second pedestal 208 comprises a saturation magnetization of about 10 kG to about 22 kG. In some embodiments, the second pedestal 208 comprises a saturation magnetization of about 19 kG.

In some embodiments, the second return pole 306 comprises a magnetic leading shield (MLS) 309 positioned adjacent to the air-bearing surface 311. In some embodiments, the magnetic leading shield 309 has a thickness 212 of about 0.1 µm to about 0.8 µm. In some embodiments, the magnetic leading shield 309 has a thickness 212 of about 0.5 µm. In some embodiments, the magnetic leading shield 309 has a height 316 of about 500 nm to about 1,000 nm. In some embodiments, the magnetic leading shield 309 has a height 316 of about 800 nm.

In some embodiments, the second return pole 306 may be operably connected to the main magnetic pole 302 by a second connector 307. In some embodiments, the second connector 307 comprises a magnetic material with a saturation magnetization lower than that of the main magnetic pole 302. In some embodiments, the second connector 307 comprises a saturation magnetization of about 10 kG to about 22 kG. In some embodiments, the second connector 307 comprises a saturation magnetization of about 19 kG.

In such embodiments wherein the writer head comprises a first return pole 303 and a second return pole 306 the writer head may comprise at least one coil 317 positioned between the first return pole 303 and the main magnetic pole 302 and at least one coil 317 positioned between the second return pole 306 and the main magnetic pole 302. In some embodiments, the total number of loops between the first return pole 303 and the main magnetic pole 302 and between the second return pole 306 and the main magnetic pole 302 is the same. In some embodiments, the writer head comprises a total number of loops numbering from 1 to 6.

Methods

Methods may be performed to manufacture the above-described optical components for HAMR writer heads.

A method for manufacturing an optical component for a HAMR writer head comprises providing a substrate, depositing a triangular layer on the surface of the substrate, and depositing each subsequent layer of the optical component. Each layer may be deposited by any method known to one of skill in the art. In some embodiments, the method comprises depositing each layer by one of sputter deposition, physical vapor deposition, plating, chemical vapor deposition, or electron beam evaporation. Each layer may be deposited to a thickness greater than or equal to the desired thickness of the corresponding layer.

The method may further comprise surface treating each layer before the deposition of the next layer. In some embodiments, the surface of each layer is treated to reach a desired thickness and shape. In some embodiments. In some embodiments, the surface treating comprises one or more of etching, polishing, milling, laser ablation, or combinations of the above. In some embodiments, the surface treating comprises creating a smooth surface. In some embodiments, the surface of the one or more of the layers is treated to create a tapered section comprising a tapered edge. In some embodiments, the tapered edge has an angle of about 20 degrees to about 70 degrees. In some embodiments, the tapered edge has an angle of about 45 degrees. In some embodiments, the surface may be treated to control the position of the layer relative to an air-bearing surface.

The method may further comprise operably connecting a magnetic main pole to the optical component. In some embodiments, the magnetic main pole is deposited on the optical component. The magnetic main pole may be deposited by any method known to one of skill in the art. In some embodiments, the magnetic main pole is deposited by one of sputter deposition, physical vapor deposition, plating, chemical vapor deposition, or electron beam evaporation. In some embodiments, the main magnetic pole is deposited by first depositing a first material with a first magnetic moment and depositing a second material with a second magnetic moment on the surface of the first material. The magnetic main pole may be deposited to a thickness greater than or equal to the desired thickness of the final product. In some embodiments, the method further comprises surface treating the surface of the magnetic main pole opposite the optical component to create a tapered edge. In some embodiments, the tapered edge has an angle of about −15 degrees to about −45 degrees. In some embodiments, the tapered edge has an angle of about −20 degrees. In some embodiments, the method further comprises surface treating the surface of the magnetic main pole opposite the optical component to create a flat surface.

EXAMPLES

Example 1: Magnetic Field Testing

Figure 4:
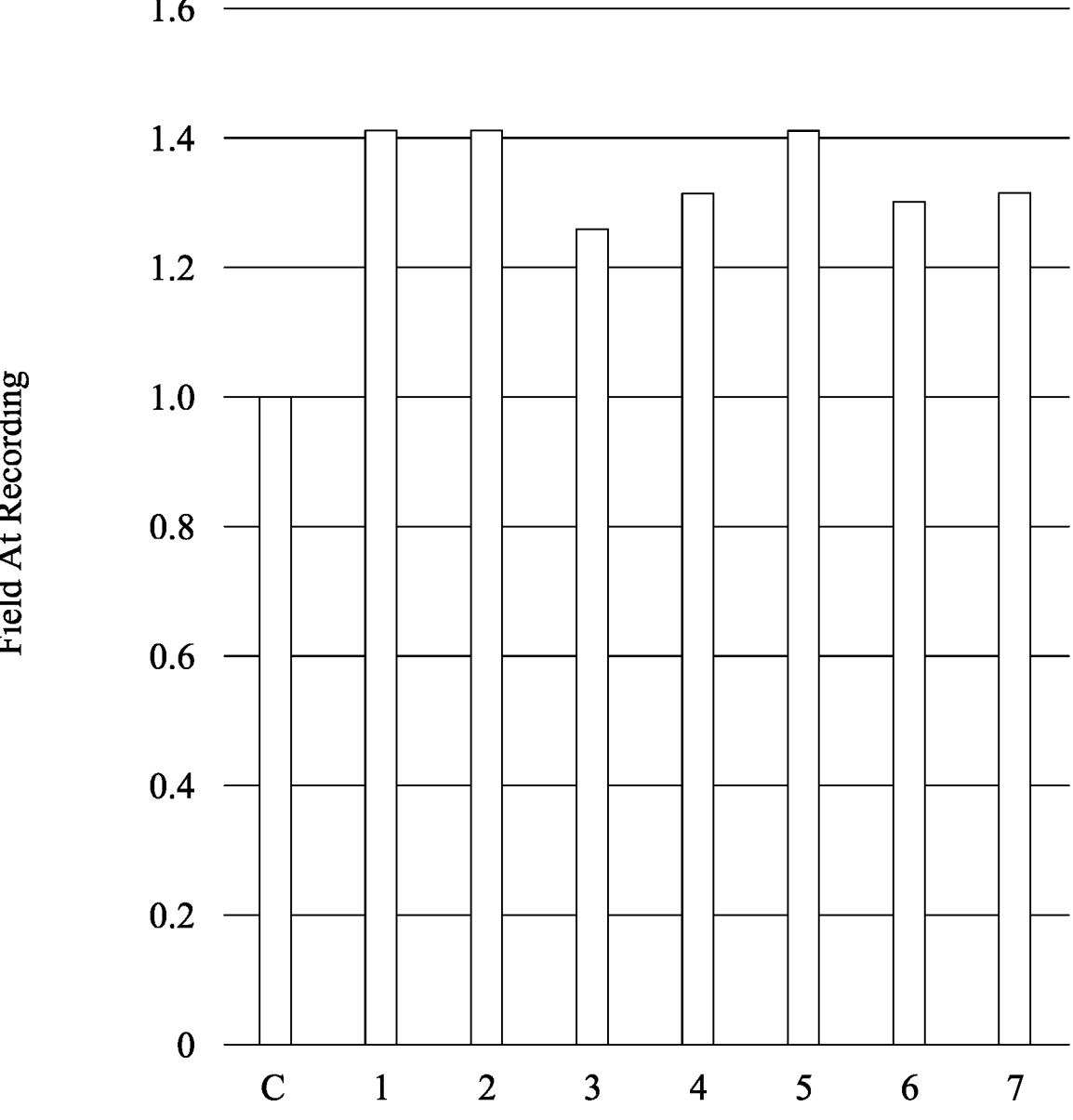
FIGS. 4-5 depict graphical representations of the performance metrics of writer heads in accordance with an embodiment.
Figure 5:
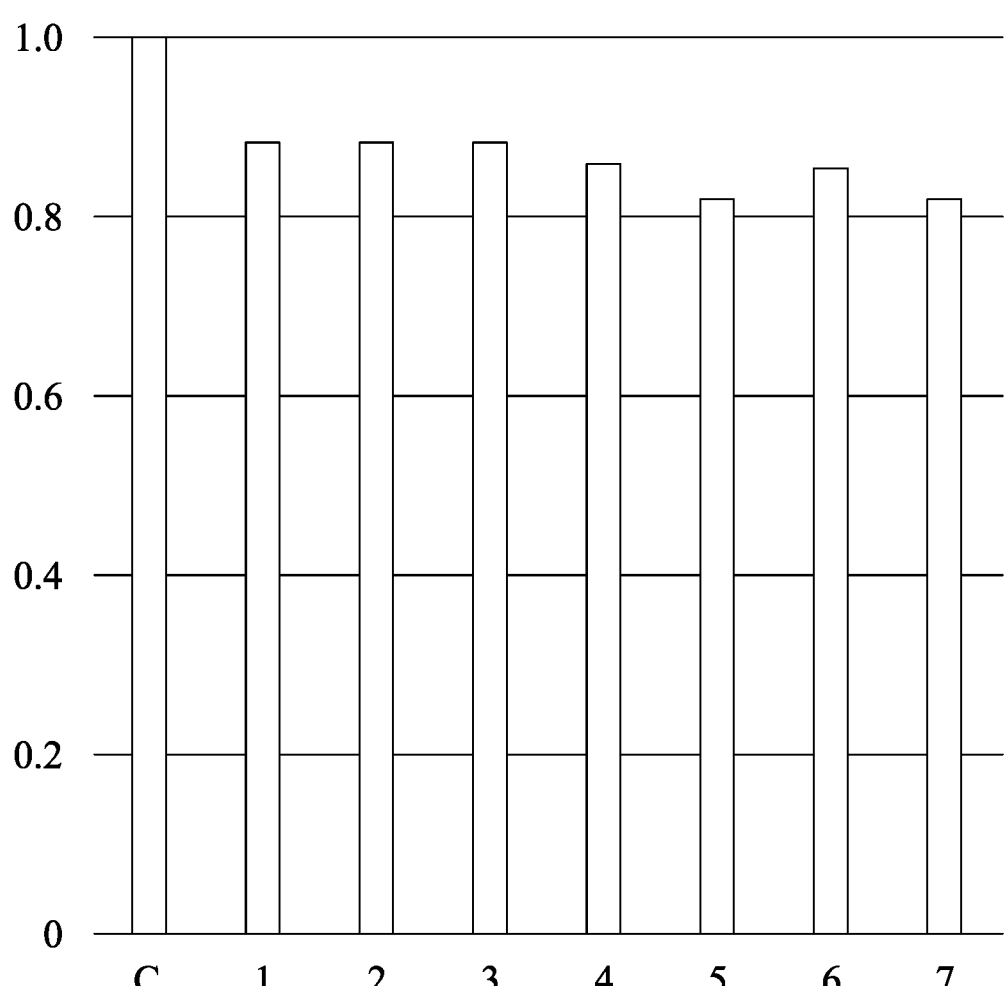

The magnetic of HAMR writer heads as described in the present disclosure herein were compared against an existing HAMR writer head design. The HAMR writer head structures included optical components and magnetic main poles with the following parameters: (1) a writer head with the structure of FIG. 1A, (2) a writer head with the structure of FIG. 1B, (3) a writer head with the structure of FIG. 1C, (4) a writer head with the structure of FIG. 1D, (5) a writer head with the structure of FIG. 1E, (6) a writer head with the structure of FIG. 2A, and (&) a writer head with the structure of FIG. 2B. The properties were tested using finite-element-based modeling and simulations and calculating the magnetic field at the recording and the magnetic field angle at the recording. Graphical representations of the results of the testing are provided in FIGS. 4-5. Each of the samples HAMR writer heads outperformed the existing HAMR writer head in both the magnetic field at the recording and the magnetic field angle at the recording. Test cases 1, 2, and 5 each had an over 40% magnetic field at the recording location than the existing HAMR writer head. Furthermore, each HMAR writer head sample had at least a 10% lower magnetic field angle at the recording location than the existing HAMR writer head, with the test case 5 having a lower magnetic field angle by about 19%. These improvements show that the tapered main pole provides a significant increase in the areal density capacity of the HAMR.

CONCLUSION

As used herein, the term "about," when immediately preceding a numerical value, means a range of plus or minus 10% of that value; for example, "about 50" means 45 to 55, "about 25,000" means 22,500 to 27,500, etc., unless the context of the disclosure indicates otherwise, or is inconsistent with such an interpretation.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure and those enumerated herein will be evident to those skilled in the art from the descriptions. Such modifications and variations are intended to fall within the scope of the appended claims. The present disclosure is limited only by the terms of the appended claims and the full scope of equivalents to which such claims are entitled. It is to be understood that this disclosure is not limited to particular methods, reagents, compounds, compositions, or biological systems, which can, of course, vary. It is also to be understood that the terminology used herein describes particular embodiments only and is not intended to be limiting.

As used in this document, the singular forms "a," "an," and "the" include plural references unless the context dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by prior invention. As this document uses, "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Concerning the use of substantially any plural and singular terms herein, those having skill in the art can translate from the plural to the singular and from the singular to the plural as is appropriate to the context and application. The various singular/plural permutations may be expressly set forth herein for clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may use the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and "an" should be interpreted to mean "at least one" or "one or more"); the same holds for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, implies at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and A, B, and C together, etc.). It will be further understood by those within the art that virtually any disjunctive word and phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also described in terms of any individual member or subgroup of members of the Markush group.

As will be understood by one skilled in the art, for any purposes, such as providing a written description, all ranges disclosed herein also encompass any possible subranges and combinations thereof. Any listed range can be easily recognized as sufficiently describing and enabling the same range to be broken down into at least equal halves, thirds, quarters, fifths, tenths, etc. As a non-limiting example, each range discussed herein can be readily broken down into a lower third, middle third, upper third, etc. As will also be understood by one skilled in the art, all languages such as "up to," "at least," and the like include the number recited and refer to ranges that can be broken down into subranges as discussed above. Finally, as will be understood by one skilled in the art, a range includes each member. Thus, for example, a group with 1-3 cells refers to groups with 1, 2, or 3 cells. Similarly, a group having 1-5 cells refers to groups having 1, 2, 3, 4, or 5 cells, and so forth.

What is claimed is:

1. A writer head for a heat-assisted magnetic recording (HAMR) device, the writer head comprising:
   an optical component including:
      a triangular layer having a tapered edge;
      a first cladding layer positioned adjacent to the triangular layer;
      a waveguide (WG) layer positioned adjacent to the first cladding layer;
      a second cladding layer positioned adjacent to the WG layer;
      a near field transducer (NFT) layer positioned adjacent to the second cladding layer;
      a heat sink layer positioned adjacent to the NFT layer; and
      a triangular peg gap layer positioned adjacent to the heat sink layer and comprising a tapered angle of about 20 degrees to about 70 degrees; and
      a magnetic main pole positioned adjacent to the triangular peg gap layer and the heat sink layer and having a saturation magnetization of about 24 kG or greater.

2. The writer head of claim 1, wherein a surface of the magnetic main pole includes a tapered angle equal to the tapered angle of the triangular peg gap layer.

3. The writer head of claim 1, wherein a surface of the magnetic main pole opposite the tapered peg gap layer includes a flat surface.

4. The writer head of claim 1, wherein a surface of the magnetic main pole opposite the tapered peg gap layer includes a taper comprising an angle equal and opposite to the angle of the triangular peg gap layer.

5. The writer head of claim 1, wherein a surface of the magnetic main pole opposite the tapered peg gap layer includes a slope with an angle of about −15 degrees to about −45 degrees.

6. The writer head of claim 1, wherein a surface of the magnetic main pole opposite the tapered peg gap layer includes a slope with an angle of about −15 degrees to about −45 degrees and wherein the surface of the heat sink layer contacting the magnetic main pole includes a taper with an angle of about −15 degrees to about −45 degrees.

7. The writer head of claim 1, wherein the magnetic main pole includes a first layer adjacent to the peg gap layer and a second layer adjacent to the first layer wherein the first layer includes a lower magnetic moment than the second layer.

8. The writer head of claim 7, wherein the first layer has a thickness of about 10 nm to about 50 nm.

9. The writer head of claim 7, wherein the first layer includes one or more of CoFe, NiFe, CoFeNi and a dopant comprising a transition metal.

10. The writer head of claim 9, wherein the dopant includes one or more of palladium or rhenium.

11. The writer head of claim 1, wherein the triangular layer includes a waveguide blocking layer comprising ruthenium.

12. The writer head of claim 1, wherein the triangular layer includes one or more of alumina or silica.

13. The writer head of claim 1, wherein the NFT layer includes a first NFT layer comprising a first metal and a second NFT layer comprising a transition metal,
   wherein the first NFT layer includes one or more of gold, silver, copper, alloys thereof, graphene, and a metal oxide; and
   wherein the second NFT layer includes one of Rh or Ir.

14. The writer head of claim 1, wherein the heat sink layer includes one or more of gold, ruthenium, aluminum nitride, or silicon carbide.

15. The writer head of claim 1, wherein the optical component further includes a laser diode configured to generate a beam of light.

16. The writer head of claim 1, further comprising:
   a magnetic component that includes a first return pole operably connected to the main magnetic pole by a first connector and positioned on a side of the main magnetic pole opposite of the optical component.

17. The writer head of claim 16, wherein the magnetic component further includes a coil comprising between 0 and 6 loops, wherein the coil is positioned between the first return pole and the main magnetic pole.

18. The writer head of claim 16, wherein the distance between the first return pole and the main magnetic pole is about 50 nm to about 1,000 nm.

19. The writer head of claim 16, wherein the first return pole has a thickness of about 500 nm to about 1,500 nm.

20. The writer head of claim 16, wherein the first return pole includes a first pedestal with a thickness of about 1.5 μm to about 2.5 μm and a height of about 200 nm to about 1,000 nm.

21. The writer head of claim 16, wherein the first return pole further includes a first magnetic leading shield (MLS) having a thickness of about 100 nm to about 1,000 nm and a height of about 500 nm to about 2,000 nm.

22. The writer head of claim 16, wherein the magnetic component includes a first yoke positioned between the first connector and the main magnetic pole.

23. The writer head of claim 16, wherein the main magnetic pole includes a sloped back edge having an angle of about 15 degrees to about −75 degrees.

24. The writer head of claim 16, wherein the magnetic component includes a second return pole operably connected to the main magnetic pole by a second connector and positioned on a side of the main magnetic pole opposite of the first return pole.

25. The writer head of claim 24, wherein the distance between the second return pole and the main magnetic pole is about 100 nm to about 1,000 nm.

26. The writer head of claim 24, wherein the second return pole has a thickness of about 100 nm to about 1,500 nm.

27. The writer head of claim 24, wherein the second return pole includes a second pedestal with a thickness of about 1.5 μm to about 2.5 μm and a height of about 200 nm to about 1,000 nm.

28. The writer head of claim 24, wherein the second return pole further includes a second magnetic leading shield (MLS) having a thickness of about 100 nm to about 800 nm and a height of about 500 nm to about 1,000 nm.

29. The writer head of claim 24, wherein the magnetic component further includes a first coil and a second coil, wherein the first coil and the second coil combined comprise between 0 and 6 loops, wherein the first coil is positioned between the first return pole and the main magnetic pole, wherein the second coil is positioned between the second return pole and the main magnetic pole, and wherein the first coil and the second coil comprise the same number of loops.

* * * * *